(12) United States Patent
Feuersaenger et al.

(10) Patent No.: US 9,843,960 B2
(45) Date of Patent: *Dec. 12, 2017

(54) BUFFER STATUS REPORTING IN A MOBILE COMMUNICATION SYSTEM

(71) Applicant: Panasonic Intellectual Property Corporation of America, Torrance, CA (US)

(72) Inventors: Martin Feuersaenger, Bremen (DE); Joachim Loehr, Wiesbaden (DE); Christian Wengerter, Kleinheubach (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,440

(22) Filed: Jul. 27, 2016

(65) Prior Publication Data

US 2016/0337897 A1    Nov. 17, 2016

Related U.S. Application Data

(63) Continuation of application No. 14/734,982, filed on Jun. 9, 2015, now Pat. No. 9,439,211, which is a
(Continued)

(30) Foreign Application Priority Data

Apr. 3, 2009   (EP) .................................... 09005010

(51) Int. Cl.
*H04L 12/26*    (2006.01)
*H04W 28/02*    (2009.01)
(Continued)

(52) U.S. Cl.
CPC .... *H04W 28/0278* (2013.01); *H04W 72/0413* (2013.01); *H04W 72/1236* (2013.01);
(Continued)

(58) Field of Classification Search
CPC .................................................. H04W 72/1284
(Continued)

(56) References Cited

U.S. PATENT DOCUMENTS 8,265,640 B2 * 9/2012 Meylan ............. H04W 72/1284
370/328
8,483,146 B2 * 7/2013 Chun ................ H04W 72/1284
370/328
(Continued)

FOREIGN PATENT DOCUMENTS

EP      1 608 194 A1    12/2005
WO      2008/024890 A2   2/2008
(Continued)

OTHER PUBLICATIONS

"3rd Generation Partnership Project; Technical Specification Group Radio Access Network; Physical layer aspects for evolved Universal Terrestrial Radio Access (UTRA) (Release 7)," 3GPP TR 25.814 V7.1.0, Sep. 2006, 132 pages.
(Continued)

*Primary Examiner* — Guang Li
(74) *Attorney, Agent, or Firm* — Seed IP Law Group LLP

(57) ABSTRACT

An invention relates to methods for transmitting a buffer status report (BSR) in a mobile communication system, more particularly to the definition of rules for triggering, generating and transmitting BSRs. The invention also relates to a data transmission method utilizing new rules to decide data of which radio bearers is transmitted within a given transmission time interval. Moreover, the invention relates to scheduling method for radio resources that is taking into
(Continued)

account additional scheduling-relevant information from the buffer status reporting and/or data transmission method. To avoid unnecessary grants from the network and to suggest an advanced handling of data transmissions the invention suggests a buffer status reporting and data transmission schemes that take into account the scheduling mode of data of radio bearers pending for transmission to decide whether to report on it in a buffer status report, respectively, whether to multiplex the data to a transport block for transmission.

20 Claims, 11 Drawing Sheets

Related U.S. Application Data continuation of application No. 14/313,750, filed on Jun. 24, 2014, now Pat. No. 9,084,137, which is a continuation of application No. 13/257,270, filed as application No. PCT/EP2010/002118 on Apr. 1, 2010, now Pat. No. 8,792,440.

(51) Int. Cl.
  *H04W 72/12* (2009.01)
  *H04W 72/04* (2009.01)
  *H04W 88/08* (2009.01)

(52) U.S. Cl.
  CPC ... *H04W 72/1268* (2013.01); *H04W 72/1284* (2013.01); *H04W 72/04* (2013.01); *H04W 88/08* (2013.01)

(58) Field of Classification Search
  USPC .......................................................... 370/230
  See application file for complete search history.

(56) References Cited

U.S. PATENT DOCUMENTS

| | | |
|---|---|---|
| 2009/0046639 A1 | 2/2009 | Cai et al. |
| 2009/0052420 A1 | 2/2009 | Fischer |
| 2009/0063804 A1 | 3/2009 | Trainin |
| 2009/0113086 A1* | 4/2009 | Wu ................... H04W 72/1284 710/56 |
| 2009/0196236 A1* | 8/2009 | Cai ......................... H04L 47/10 370/329 |
| 2009/0197610 A1* | 8/2009 | Chun ............... H04W 72/1284 455/450 |
| 2009/0238120 A1* | 9/2009 | Cai ................... H04W 72/1284 370/329 |
| 2009/0268693 A1* | 10/2009 | Lindh ................ H04W 72/042 370/336 |
| 2009/0300457 A1 | 12/2009 | Kuo |
| 2010/0040028 A1* | 2/2010 | Maheshwari ......... H04W 74/02 370/336 |
| 2010/0077100 A1 | 3/2010 | Hsu et al. |
| 2010/0080155 A1 | 4/2010 | Suzuki et al. |
| 2010/0115355 A1 | 5/2010 | Hsu |
| 2010/0135166 A1 | 6/2010 | Ahluwalia |
| 2010/0136166 A1* | 6/2010 | Ye ........................ A23C 9/1315 426/7 |
| 2010/0177721 A1 | 7/2010 | Simonsson et al. |
| 2010/0238875 A1* | 9/2010 | Sung ...................... H04L 12/66 370/329 |
| 2010/0322098 A1 | 12/2010 | Pelletier et al. |
| 2011/0141983 A1* | 6/2011 | Hong ................ H04W 28/0278 370/329 |
| 2011/0287738 A1* | 11/2011 | Peisa ..................... H04W 24/08 455/405 |
| 2012/0039263 A1* | 2/2012 | Moberg ............ H04W 72/1284 370/329 |

FOREIGN PATENT DOCUMENTS

| | | |
|---|---|---|
| WO | 2008/151411 A1 | 12/2008 |
| WO | 2009/022822 A2 | 2/2009 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0, Section 11, dated Dec. 2008 but available since Jan. 2009, 10 pages.

"3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321 V8.5.0, Section 5.10, Mar. 2009, 7 pages.

Borman et al., "RObust Header Compression (ROHC): Framework and four profiles: RTP, UDP, ESP, and uncompressed," The Internet Society, 2001, 168 pages.

Ericsson, Nokia Corporation, Nokia Siemens Networks, Qualcomm Europe, Samsung, NTT DoCoMo, Inc., "Framework for Scheduling Request and Buffer Status Reporting," Tdoc R2-074691, Agenda Item: 5.1.1.8, TSG-RAN WG2 Meeting #60, Jeju, Korea, Nov. 5-9, 2007, 4 pages.

European Search Report dated Oct. 12, 2009, for corresponding European Application No. 09005010.5, 3 pages.

HTC Corporation "BSR Triggering with Semi-Persistent Scheduling," R2-085201, 3GPP TSG-RAN WG2 #63bis, Prague, Czech Republic, Sep. 29-Oct. 3, 2008, 7 pages.

HTC Corporation, "36.321 CR for BSR Triggering with Semi-Persistent Scheduling," R2-087205, 3GPP TSG-RAN2 Meeting #64, Prague, Czech Republic, Sep. 29-Oct. 4, 2008, 3 pages.

International Search Report dated Jan. 7, 2010, for corresponding International Application No. PCT/EP2010/002118, 3 pages.

Nokia Corporation, Nokia Siemens Networks, "Persistent scheduling for UL," R2-080019, R2-074679, Agenda Item: 4.3.3, 3GPP TSG-RAN WG2 Meeting #60bis, Sevilla, Spain, Jan. 14-18, 2008, 4 pages.

Nokia Corporation, Nokia Siemens Networks, "Persistent scheduling for UL," R2-082303, R2-081543, Agenda Item: 5.1.1.8, 3GPP TSG-RAN WG2 Meeting #62, Kansas City, USA, May 5-9, 2008, 4 pages.

Notice of Reasons for Rejection dated Dec. 24, 2013, for corresponding Japanese Patent Application No. 2012-502515, 7 pages.

Research in Limited Motion, "Various issues regarding SR channel handling (VoIP, SRS, etc)," R2-081870, 3GPP TSG-RAN-WG2 Meeting #61bis, Shenzhen, China, Mar. 31-Apr. 4, 2008, 3 pages.

T-Mobile, NTT DoCoMo, VodaFone, Orange, KPN, "Operator requirements and scenarios for UL buffer reporting/scheduling and grant assignment in E-UTRAN," R2-062606, Agenda Item: 11.3.6, 3GPP TSG-RAN WG2#54, Tallinn, Estonia, Aug. 28-Sep. 1, 2006, 2 pages.

Chinese Third Office Action dated Oct. 29, 2014, for corresponding CN Application No. 201080015545.X, 11 pages.

* cited by examiner

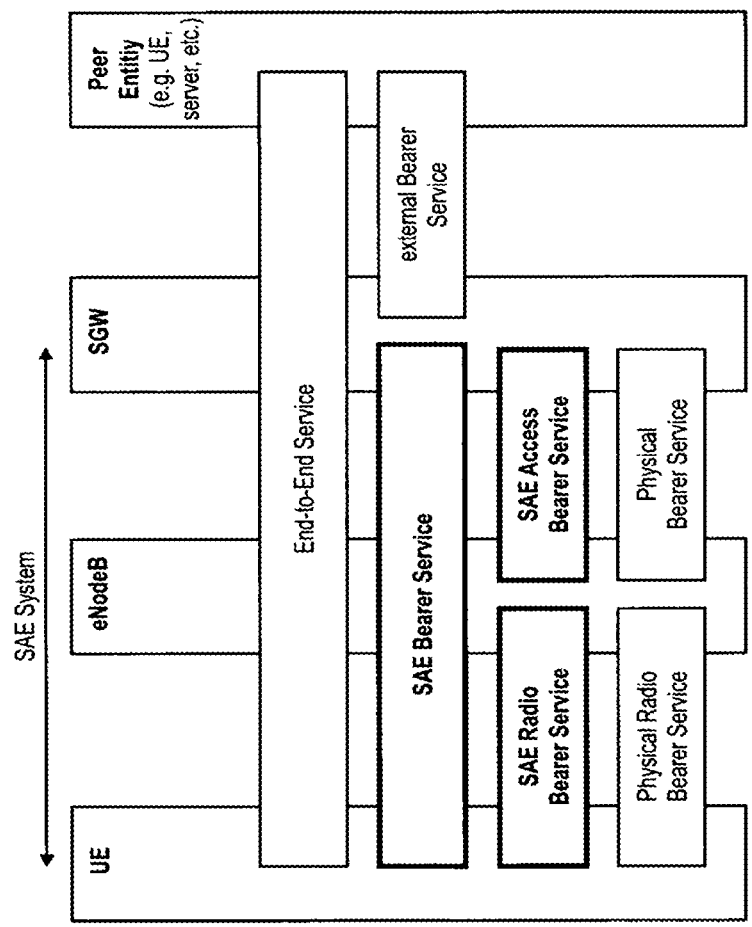

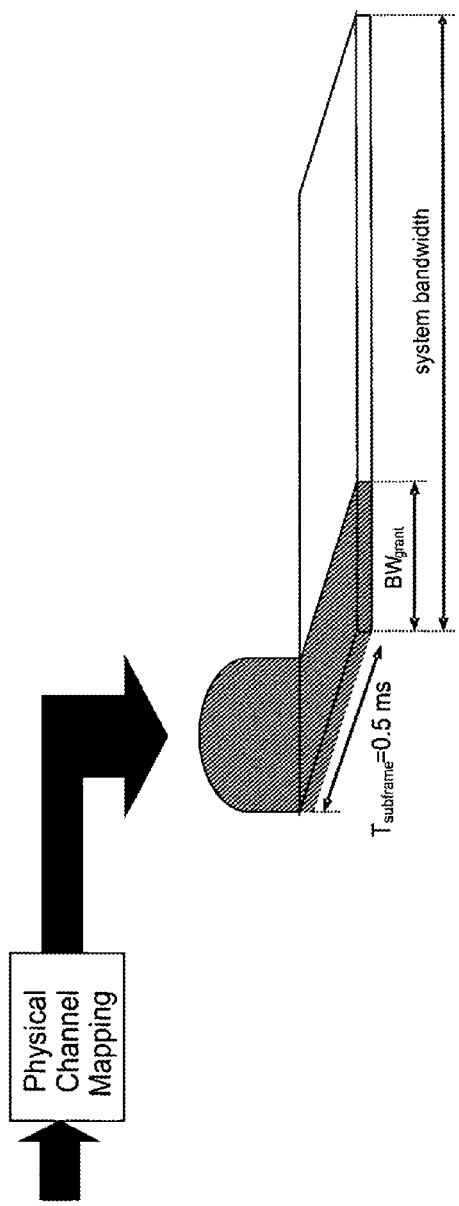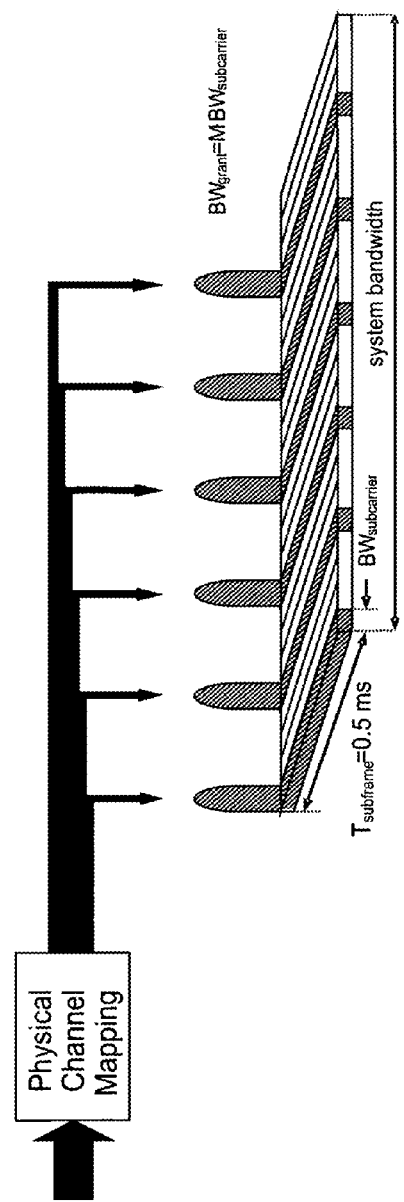

BUFFER STATUS REPORTING IN A MOBILE COMMUNICATION SYSTEM

FIELD OF THE INVENTION

The invention relates to methods for transmitting a buffer status report by a communication node in a mobile communication system, and more particularly to the definition of rules for triggering, generating and transmitting buffer status reports. Furthermore, the invention is also related to an data transmission method utilizing a new set of rules to decide data of which radio bearers is to be transmitted within a given transmission time interval. Moreover, the invention also relates to scheduling radio resources within a mobile communication system that is taking into account additional scheduling-relevant information from the buffer status reporting and/or data transmission method. The invention also relates to the implementation/performance of these methods in/by hardware, i.e. apparatuses, and their implementation in software.

TECHNICAL BACKGROUND

Long Term Evolution (LTE)

Third-generation mobile systems (3G) based on WCDMA (Wideband Code Division Multiple Access) radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP ($3^{rd}$ Generation Partnership Project) has begun considering the next major step or evolution of the 3G standard to ensure the long-term competitiveness of 3G. The 3GPP launched a Study Item "Evolved UTRA and UTRAN" (abbreviated E-UTRA and E-UTRAN) also referred to as long-term evolution (LTE). The study will investigate means of achieving major leaps in performance in order to improve service provisioning and reduce user and operator costs.

It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned.

More specifically, some key performance and capability targets for the long-term evolution are Significantly higher data rates compared to HSDPA and HSUPA: envisioned target peak data rates of more than 100 Mbps over the downlink and 50 Mbps over the uplink Improved coverage: high data rates with wide-area coverage Significantly reduced latency in the user plane in the interest of improving the performance of higher layer protocols (for example, TCP) as well as reducing the delay associated with control plane procedures (for instance, session setup)

Greater system capacity: threefold capacity compared to current standards.

One other key requirement of the long-term evolution is to allow for a smooth migration to these technologies.

LTE Architecture

In FIG. 1 an overview of a 3GPP LTE mobile communication network is shown. The network consists of different network entities that are functionally grouped into the Evolved Packet Core (EPC), the Radio Access Network (RAN) and the User Equipments (UEs) or mobile terminals.

The radio access network is responsible for handling all radio-related functionality inter alia including scheduling of radio resources. The evolved packet core may be responsible for routing calls and data connections to external networks.

The LTE network is a "two node architecture" consisting of serving gateways (SGW) and enhanced base stations, so-called eNode Bs (abbreviated eNB or eNode B). The serving gateways will handle evolved packet core functions, i.e. routing calls and data connections to external networks, and also implement radio access network functions. Thus, the serving gateway may be considered as to combine functions performed by GGSN (Gateway GPRS Support Node) and SGSN (Serving GPRS Support Node) in today's 3G networks and radio access network functions as for example header compression, ciphering/integrity protection. The eNode Bs may handle functions as for example Radio Resource Control (RRC), segmentation/concatenation, scheduling and allocation of resources, multiplexing and physical layer functions.

A mobile communication network is typically modular and it is therefore possible to have several network entities of the same type. The interconnections of network elements are defined by open interfaces. UEs can connect to an eNode B via the air interface or Uu. The eNode Bs have a connection to a serving gateway via the S1 interface. Two eNode Bs are interconnected via the X2 interface.

Both 3GPP and Non-3GPP integration may be handled via the serving gateway's interface to the external packet data networks (e.g. Internet).

QoS Control

Efficient Quality of Service (QoS) support is seen as a basic requirement by operators for LTE. In order to allow best in class user experience, while on the other hand optimizing the network resource utilization, enhanced QoS support should be integral part of the new system.

Aspects of QoS support is currently being under discussion within 3GPP working groups. Essentially, the QoS design for System Architecture Evolution (SAE)/LTE is based on the QoS design of the current UMTS system reflected in 3GPP TR 25.814, "Physical layer aspects for evolved Universal Terrestrial Radio Access (UTRA)", v.7.1.0 (available at http://www.3gpp.org and incorporated herein by reference). The agreed SAE Bearer Service architecture is depicted in FIG. 2. The definition of a bearer service as given in 3GPP TR 25.814 may still be applicable:

"A bearer service includes all aspects to enable the provision of a contracted QoS. These aspects are among others the control signaling, user plane transport and QoS management functionality".

In the new SAE/LTE architecture the following new bearers have been defined: the SAE Bearer service between the mobile terminal (User Equipment—UE) and the serving gateway, the SAE Radio Bearer on the radio access network interface between mobile terminal and eNode B as well as the SAE Access Bearer between the eNode B and the serving gateway.

The SAE Bearer Service provides:

QoS-wise aggregation of IP end-to-end-service flows;

IP header compression (and provision of related information to UE);

User Plane (UP) encryption (and provision of related information to UE);

if prioritized treatment of end-to-end-service signaling packets is required an additional SAE Bearer Service can be added to the default IP service;

provision of mapping/multiplexing information to the UE;

provision of accepted QoS information to the UE.

The SAE Radio Bearer Service provides:

transport of the SAE Bearer Service data units between eNode B and UE according to the required QoS;

linking of the SAE Radio Bearer Service to the respective SAE Bearer Service.

The SAE Access Bearer Service provides:

transport of the SAE Bearer Service data units between serving gateway and eNode B according to the required QoS;

provision of aggregate QoS description of the SAE Bearer Service towards the eNode B;

linking of the SAE Access Bearer Service to the respective SAE Bearer Service.

In 3GPP TR 25.814 a one-to-one mapping between an SAE Bearer and an SAE Radio Bearer. Furthermore there is a one-to-one mapping between a radio bearer (RB) and a logical channel. From that definition it follows that a SAE Bearer, i.e. the corresponding SAE Radio Bearer and SAE Access Bearer, is the level of granularity for QoS control in an SAE/LTE access system. Packet flows mapped to the same SAE Bearer receive the same treatment.

For LTE there will be two different SAE bearer types: the default SAE bearer with a default QoS profile, which is configured during initial access and the dedicated SAE bearer (SAE bearers may also be referred to as SAE bearer services) which is established for services requiring a QoS profile which is different from the default one.

The default SAE bearer is an "always on" SAE bearer that can be used immediately after LTE_IDLE to LTE_ACTIVE state transition. It carries all flows which have not been signaled a Traffic Flow Template (TFT). The Traffic Flow Template is used by serving gateway to discriminate between different user payloads. The Traffic Flow Template incorporates packet filters such as QoS. Using the packet filters the serving gateway maps the incoming data into the correct PDP Context (Packet Data Protocol Context). For the default SAE bearer, several service data flows can be multiplexed. Unlike the Default SAE Bearer, the Dedicated SAE Bearers are aimed at supporting identified services in a dedicated manner, typically to provide a guaranteed bit-rate. Dedicated SAE bearers are established by the serving gateway based on the QoS information received in Policy and Charging Control (PCC) rules from evolved packet core when a new service is requested. A dedicated SAE bearer is associated with packet filters where the filters match only certain packets. A default SAE bearer is associated with "match all" packet filters for uplink and downlink. For uplink handling the serving gateway builds the Traffic Flow Template filters for the dedicated SAE bearers. The UE maps service data flows to the correct bearer based on the Traffic Flow Template, which has been signaled during bearer establishment. As for the default SAE Bearer, also for the dedicated SAE Bearer several service data flows can be multiplexed.

The QoS Profile of the SAE bearer is signaled from the serving gateway to the eNode B during the SAE bearer setup procedure. This profile is then used by the eNode B to derive a set of Layer 2 QoS parameters, which will determine the QoS handling on the air interface. The Layer 2 QoS parameters are input the scheduling functionality. The parameters included in the QoS profile signaled on S1 interface from serving gateway to eNode B are currently under discussion. Most likely the following QoS profile parameters are signaled for each SAE bearer: Traffic Handling Priority, Maximum Bit-rate, Guaranteed Bit-rate. In addition, the serving gateway signals to the eNode B the Allocation and Retention Priority for each user during initial access.

Uplink Access Scheme for LTE

For uplink transmission, power-efficient user-terminal transmission is necessary to maximize coverage. Single-carrier transmission combined with FDMA (Frequency Division Multiple Access) with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA—Orthogonal Frequency Division Multiple Access), and the corresponding improved power-amplifier efficiency and assumed improved coverage (higher data rates for a given terminal peak power). During each time interval, Node B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size $BW_{grant}$ during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as shown in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio. The key difference between a distributed single-carrier signal versus a multi-carrier signal, such as e.g. OFDM (Orthogonal Frequency Division Multiplex), is that, in the former case, each "sub-carrier" or "comb finger" does not carry a single modulation symbol. Instead each "comb-finger" carries information about all modulation symbols. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single UE to achieve high data rates.

UL Scheduling Scheme for LTE

The uplink scheme allows for both scheduled access, i.e. controlled by eNode B, and contention-based access.

In case of scheduled access the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access Node B scheduler assigns a user a unique frequency/time resource for uplink data transmission. More specifically the scheduler determines which UE(s) that is (are) allowed to transmit,
which physical channel resources (frequency),
for how long the resources may be used (number of sub-frames)
Transport format (Transport Block Size (TBS) and Modulation Coding Scheme (MCS)) to be used by the mobile terminal for transmission The allocation information is signaled to the UE via a scheduling grant, sent on the so-called L1/L2 control channel. For simplicity, this downlink channel is referred to the "uplink grant channel" in the following. A scheduling grant message contains at least information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the Uplink Shared Channel UL-SCH (i.e. there are no "per UE per RB" grants). Therefore the UE needs to distribute the allocated resources among the radio bearers according to some rules, which will be explained in detail in the next section. Unlike in HSUPA there is no UE based transport format selection. The base station (eNode B) decides the transport format based on some information, e.g. reported scheduling information and QoS information, and UE has to follow the selected transport format. In HSUPA Node B assigns the maximum uplink resource and UE selects accordingly the actual transport format for the data transmissions.

Uplink data transmissions are only allowed to use the time-frequency resources assigned to the UE through the scheduling grant. If the UE does not have a valid grant, it is not allowed to transmit any uplink data. Unlike in HSUPA, where each UE is always allocated a dedicated channel there is only one uplink data channel shared by multiple users (UL SCH) for data transmissions.

To request resources, the UE transmits a resource request message to the Node B. This resources request message could for example contain information on the buffer status, the power status of the UE and some Quality of Services (QoS) related information. This information, which will be referred to as scheduling information, allows Node B to make an appropriate resource allocation. Throughout the document it's assumed that the buffer status is reported for every radio bearer. Of course other configurations for the buffer status reporting are also possible.

Since the scheduling of radio resources is the most important function in a shared channel access network for determining Quality of Service, there are a number of requirements that should be fulfilled by the uplink scheduling scheme for LTE in order to allow for an efficient QoS management (see 3GPP RAN WG#2 Tdoc. R2-R2-062606, "QoS operator requirements/use cases for services sharing the same bearer", by T-Mobile, NTT DoCoMo, Vodafone, Orange, KPN; available at http://www.3gpp.org/and incorporated herein by reference):

The UL scheduling scheme for LTE should provide a finer network-based QoS control than what is supported in UMTS Release 6 (HSUPA)

Starvation of low priority services should be avoided

Clear QoS differentiation for radio bearers/services should be supported by the scheduling scheme The UL reporting should allow fine granular buffer reports (e.g. per radio bearer or per radio bearer group) in order to allow the eNode B scheduler to identify for which Radio Bearer/service data is to be sent.

It should be possible to change the priorities used in the UL scheduling decision of the UE dynamically—based on operator requirements It should be possible to make clear QoS differentiation between services of different users It should be possible to provide a minimum bit-rate per radio bearer As can be seen from above list one essential aspect of the LTE scheduling scheme is to provide mechanisms with which the operator can control the partitioning of its aggregate cell capacity between the radio bearers of the different QoS classes. The QoS class of a radio bearer is identified by the QoS profile of the corresponding SAE bearer signaled from serving gateway to eNode B as described before. An operator can then allocate a certain amount of its aggregate cell capacity to the aggregate traffic associated with radio bearers of a certain QoS class.

The main goal of employing this class-based approach is to be able to differentiate the treatment of packets depending on the QoS class they belong to. For example, as the load in a cell increases, it should be possible for an operator to handle this by throttling traffic belonging to a low-priority QoS class. At this stage, the high-priority traffic can still experience a low-loaded situation, since the aggregate resources allocated to this traffic is sufficient to serve it. This should be possible in both uplink and downlink direction.

One benefit of employing this approach is to give the operator full control of the policies that govern the partitioning of the bandwidth. For example, one operator's policy could be to, even at extremely high loads, avoid starvation of traffic belonging to its lowest priority QoS Class. The avoidance of starvation of low priority traffic is one of the main requirements for the UL scheduling scheme in LTE. In current UMTS Release 6 (HSUPA) scheduling mechanism the absolute prioritization scheme may lead to starvation of low priority applications. E-TFC selection (Enhanced Transport Format Combination selection) is done only in accordance to absolute logical channel priorities, i.e. the transmission of high priority data is maximized, which means that low priority data is possibly starved by high priority data. In order to avoid starvation the Node B scheduler must have means to control from which radio bearers a UE transmits data. This mainly influences the design and use of the scheduling grants transmitted on the L1/L2 control channel in downlink. In the following the details of the UL rate control procedure in LTE is outlined.

Semi-Persistent Scheduling (SPS)

In the downlink and uplink, the scheduling eNode B dynamically allocates resources to user equipments at each transmission time interval via the L1/L2 control channel(s) (PDCCH(s)) where the user equipments are addressed via their specific C-RNTIs. The CRC of a PDCCH is masked with the addressed user equipment's C-RNTI (so-called dynamic PDCCH). Only a user equipment with a matching C-RNTI can decode the PDCCH content correctly, i.e. the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are scheduled, this kind of operation is referred to as semi-persistent scheduling (SPS), i.e. resources are allocated to the user equipment on a semi-persistent basis (semi-persistent resource allocation). The benefit is that PDCCH resources for initial HARQ transmissions are saved. For details on semi-persistent scheduling, see 3GPP TS 36.300, "Evolved Universal Terrestrial Radio Access (E-UTRA) and Evolved Universal Terrestrial Radio Access Network (E-UTRAN); Overall description; Stage 2 (Release 8)", version 8.7.0, section 11, January 2009 or 3GPP TS 36.321 "Evolved Universal Terrestrial Radio Access (E-UTRA); Medium Access Control (MAC) protocol specification (Release 8)", version 8.5.0, section 5.10 March 2009, both available at http://www.3gpp.org and incorporated herein by reference.

One example for a service, which might be scheduled using semi-persistent scheduling is Voice over IP (VoIP). Every 20 ms a VoIP packet is generated at the codec during a talk-spurt. Therefore eNode B could allocated uplink or respectively downlink resource persistently every 20 ms, which could be then used for the transmission of Voice over IP packets. In general, semi-persistent scheduling is beneficial for services with a predictable traffic behavior, i.e. constant bit rate, packet arrival time is periodic.

The user equipment also monitors the PDCCHs in a sub-frame where it has been allocated resources for an initial transmission persistently. A dynamic (scheduling) grant, i.e. PDCCH with a C-RNTI-masked CRC, can override a semi-persistent resource allocation. In case the user equipment finds its C-RNTI on the L1/L2 control channel(s) in the sub-frames where the sub-frame has a semi-persistent resource assigned, this L1/L2 control channel allocation overrides the semi-persistent resource allocation for that transmission time interval and the user equipment does follow the dynamic grant. When sub-frame doesn't find a dynamic grant it will transmit/receive according to the semi-persistent resource allocation.

The configuration of semi-persistent scheduling is done by RRC signaling. For example the periodicity, i.e. PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the activation SPS PDCCH every semi-persistent scheduling interval (SPS interval). Essentially the user equipment stores the SPS activation PDCCH content and follows the PDCCH with the signaled periodicity.

In order to distinguish a dynamic PDCCH from a PDCCH, which activates semi-persistent scheduling, i.e. also referred to as SPS activation PDCCH, a separate identity has been introduced in LTE. Basically, the CRC of a SPS activation PDCCH is masked with this additional identity which is in the following referred to as SPS C-RNTI. The size of the SPS C-RNTI is also 16 bits, same as the normal C-RNTI. Furthermore the SPS C-RNTI is also user equipment-specific, i.e. each user equipment configured for semi-persistent scheduling is allocated a unique SPS C-RNTI.

In case a user equipment detects a semi-persistent resource allocation is activated by a corresponding SPS PDCCH, the user equipment will store the PDCCH content (i.e. the semi-persistent resource assignment) and apply it every semi-persistent scheduling interval, i.e. periodicity signaled via RRC. As already mentioned, a dynamic allocation, i.e. signaled on dynamic PDCCH, is only a "one-time allocation".

Similar to the activation of semi-persistent scheduling, the eNode B also can deactivate semi-persistent scheduling. Semi-persistent scheduling de-allocation is signaled by SPS PDCCH with both the Modulation and coding scheme field and the Resource Block Assignment field bits all set to '1'.

For semi-persistent scheduling (SPS) in LTE Release 8, if semi-persistent scheduling is configured and activated, it is assumed that there is only one radio bearer set up which has data suitable for semi-persistent scheduling. For future releases of LTE (e.g. LTE-Advanced) it is assumed that more than one radio bearer suitable for semi-persistent scheduling can be set up, so that semi-persistent scheduling needs to deliver data of more than one radio bearer.

Buffer Status Reporting

The buffer status reporting procedure in LTE is used to provide the eNode B with information about the amount of data available for transmission in the uplink buffers of the user equipments on a per logical channel basis—please note that data of each radio bearer are mapped to are respective logical channel. A so-called Buffer Status Report (BSR) is triggered, if any of the following events happen:

Uplink data, for a logical channel (i.e. of a respective radio bearer) which belongs to a Logical Channel Group (LCG), becomes available for transmission in the RLC (Radio Link Control) or PDCP (Packet Data Convergence Protocol) layer. Furthermore, the data belongs to a logical channel with higher priority than the priorities of the logical channels for which data is already available for transmission. A "Regular BSR" is triggered in this case.

Uplink resources are allocated and the number of padding bits in the transport block (MAC PDU) is equal to or larger than the size of the Buffer Status Report MAC control element. A "Padding BSR" is triggered in this case.

A serving cell change occurs. A "Regular BSR" is triggered in this case.

Furthermore, a (periodic) buffer status report is also triggered by the expiry of the following timers:

when the RETX_BSR_TIMER expires and the UE has data available for transmission a "Regular BSR" is triggered.

when PERIODIC_BSR_TIMER expires, a "Periodic BSR" is triggered.

If a "Regular BSR" or "Padding BSR" was triggered and more than one logical channel group (LCG) has data available for transmission in the referring transmission time interval a so-called "Long BSR" will be sent which is reporting on the buffer status for all four LCGs. In case only one LCG has data available, a so-called "Short BSR" including only the data of this LGC will be sent.

If a "Padding BSR" was triggered, it depends on the amount of padding bits available in the referring transmission time interval, what kind of buffer status report will be sent. If the amount of padding bits is large enough to accommodate a Long BSR, this type of BSR will be sent.

In case that more than one LCG has data in the buffer to report and the amount of padding bits does not allow a Long BSR but there are enough padding bits to send a Short BSR, a so-called "Truncated BSR" is sent. The Truncated BSR has the same format of the Short BSR and reports the LCG that includes the logical channel that has data available for transmission and that has the highest priority.

In case there is only one LCG with data to report and padding bits allow for a Short BSR, a Short BSR is send.

If the buffer status reporting procedure determines that currently a buffer status report has been triggered and the UE has uplink resources allocated for a new transmission in the current transmission time interval a BSR MAC control element is created for inclusion in the current MAC PDU, i.e. the buffer status report is multiplexed with the uplink (user) data. The PERIODIC_BSR_TIMER is restarted every time a BSR is sent, except for situations where a "Truncated BSR" is transmitted.

In case there are no uplink resources allocated for the current transmission time interval and a "Regular BSR" was triggered, a scheduling request (SR) is triggered in order to request uplink resources for transmitting the buffer status report.

In one MAC PDU, there can be at most one MAC BSR control element for sending a buffer status report, even if multiple BSR events occurred. The "Regular BSR" and the "Periodic BSR" have precedence over the "Padding BSR". The RETX_BSR_TIMER is restarted upon reception of a grant for transmission of the buffer status report.

In case the uplink grant can accommodate all pending data available for transmission but is not sufficient to additionally accommodate the BSR MAC control element, all triggered BSRs are cancelled. Furthermore, all triggered BSRs are cancelled when a buffer status report is included in a MAC PDU for transmission.

Scheduling Requests

The Scheduling Request (SR) is used for requesting resources for a new transmission, e.g. MAC PDU. As indicated above, control information, like a buffer status report, and user data are multiplexed within the MAC PDU. When a scheduling request is triggered, it is considered pending. As long as one scheduling request is pending, the user equipment first checks, if there are uplink resources available on the uplink shared channel (UL-SCH) for a transmission in this transmission time interval. In this case all pending scheduling requests are cancelled.

If there are no uplink resources on the UL-SCH within the next transmission time interval but the user equipment has a valid PUCCH resource for scheduling requests configured for this transmission time interval (and the transmission time interval is not part of a measurement gap), the user equipment transmits a scheduling request on the PUCCH and the SR_COUNTER is incremented.

If SR_COUNTER=SR_TRANS_MAX or if there are no valid PUCCH resources in any transmission time interval, all pending scheduling requests are cancelled and a Random Access procedure is initiated.

Buffer Status Reporting and its Impact on Resource Scheduling

To highlight the problems that may occur in current LTE systems in view of the above outlined buffer status reporting procedure and related scheduling behavior of the eNode Bs, an exemplary scenario is assumed in the following where there exists at least one radio bearer that carries data which is intended to be transmitted on semi-persistently configured uplink resources (semi-persistently scheduled radio bearer). For simplicity of the explanations, it is further assumed that this radio bearer is carrying data of a VoIP (Voice over IP) service. The radio bearer is therefore also referred to in the following as a "VoIP bearer".

Assuming that the VoIP bearer is the only active bearer and new VoIP data arrives in the UE buffer which was empty previously, the arrival of the new VoIP data will trigger a buffer status report (BSR) for the Logical Channel Group (LCG) the logical channel the VoIP bearer is assigned to, as described above, as can be seen in FIG. 7. The buffer status report triggers a scheduling request including the buffer status report. The scheduling request (SR) is sent to the eNode B on the next uplink control channel (PUCCH) resource. Once the eNode B is informed on the buffer status in the user equipment, the eNode B assigns a dynamic uplink radio resource by means of signaling an uplink grant on the downlink control channel (PDCCH) resources. Four TTIs after reception of the grant, the uplink radio resources are available and the VoIP data can be transmitted to eNode B.

Assuming that there is more than one radio bearer configured and more than one radio bearer assigned to the Logical Channel Group the VoIP bearer is belonging to, the eNode B only knows that the transmitted uplink data originated from the VoIP bearer after reception of the data.

Since IP packets containing VoIP data will undergo header compression (Robust Header Compression (RoHC)—see Bormann et al., IETF RFC 3095, "RObust Header Compression (ROHC): Framework and four profiles: RTP, UDP, ESP, and uncompressed", available at http://www.ietf.org) in the PDCP layer, the first few VoIP packets of the VoIP bearer may be assumed larger than those following afterwards in steady state operation of the header compression scheme, since the header compression needs to analyze the first packets in order to determine the compression parameters before the compression is activated and before the compression is effective.

The above description is the reason that in the case of VoIP traffic eNode B needs to wait for a few packets until it can determine the compressed VoIP data size in order to allocate the correct size for semi-persistently configured resources.

The above explanations apply e.g. to VoIP data, on the other hand, it is not excluded that radio bearers carrying data suitable to be transmitted on semi-persistently configured resources that show a stable data size from the beginning of the data transmission are not subject to header compression.

Once the semi-persistently configured resources in the uplink are activated and still only one VoIP bearer is actively having data the following scenario can be assumed. VoIP data has a typical periodicity of 20 ms, so the eNode B configures the semi-persistent uplink resources with a periodicity of 20 ms. In order to have low latency it is desirable to have the configured uplink resources available as soon as the VoIP data is arriving in the UE buffer. However, due to the uncertainty of the data arrival of the VoIP packets in the UE buffer, the eNode B cannot exactly determine the TTI where the configured resources should start. Therefore data arrival will be in one of the TTIs in between two configured semi-persistently uplink resources. In a good configuration the arrival of VoIP data packets will be just before the semi-persistently configured uplink resources become available.

Since the VoIP bearer is the only active radio bearer it can be assumed that the configured uplink grant is sufficient to empty the buffer of the UE. This means that all data in the buffer can be transmitted in the semi-persistently configured uplink resource and that the next VoIP data packet will arrive in an empty buffer at UE side. Furthermore, it can be assumed that while the VoIP bearer is the only active bearer, it is not the only radio bearer that is set up by the UE. Since the VoIP data arrives in an empty buffer of the UE, a buffer status report is triggered. This buffer status report becomes available in a TTI where no uplink resources are available. According to the standard LTE specifications this situation triggers a scheduling request to be sent by the UE. The scheduling request is delivered to eNode B at the next available TTI with a configured uplink control channel (PUCCH). The scenario described so far is exemplarily shown in FIG. 8.

Taking the behavior of the current LTE specification the arrival of data which is intended for the semi-persistently scheduled uplink resources is creating an unnecessary buffer status report that is delivered to the eNode B. Since the buffer status report only reports the buffer status per Logical Channel Group, the eNode B might not be aware data of which radio bearer has triggered the buffer status report. Hence, the eNode B cannot be sure that the semi-persistently scheduled resource is sufficient for delivering the data in the UE buffer in the uplink (e.g. the VoIP packet might have arrived after eNode B received the buffer status report). Therefore, the eNode B needs to assign a dynamic uplink resource to UE by means of a dynamic grant in order to assure speedy data delivery. Since dynamically scheduled uplink resources are allocated 4 transmission time intervals after sending the corresponding dynamic grant on the PDCCH, there are two scenarios for the uplink data delivery of the VoIP packet:

The dynamically scheduled resources are available before the semi-persistently scheduled resources: VoIP packet is transmitted according to the dynamic grant, so that the semi-persistently scheduled resources are wasted.

The dynamically allocated resources are available after the semi-persistently scheduled resources: The VoIP packet is transmitted on the semi-persistently scheduled resources, and the dynamically allocated resources are wasted.

In both scenarios the dynamic grant is unnecessary and either the dynamic or the semi-persistently scheduled resources are wasted.

In the following the scenario above is extended to a situation where there are two active VoIP bearers configured at the UE. It is assumed that a first VoIP bearer is already active and semi-persistently scheduled resources are configured for its data—see FIG. 9.

Every time new data from the first VoIP bearer arrives in the UE a buffer status report and a scheduling request is triggered as described above. Once the eNode B receives the buffer status report, it cannot know from which of the two configured VoIP bearers the data reported on in the buffer status report stems from. Hence, the eNode B needs to give a dynamic grant to the UE in order to assure a speedy and correct data delivery.

As can be seen in FIG. 9, if data from the second VoIP bearer arrives in the UE buffer, the buffer is once again empty and a new buffer status report and a scheduling request is triggered. Since the eNode B already received data of the first radio bearer on the dynamically allocated resources, it knows that the data reported in the new buffer status report must be from the second VoIP bearer. If the eNodeB received the buffer status well before the next TTI in which the UE has been assigned semi-persistently allocated resources, the eNode B could override the semi-persistently allocated resources with a dynamic uplink grant that fits the size of the data of the second VoIP bearer, which means that both the data of the first and the second VoIP bearer can be transmitted on the overwritten semi-persistently allocated uplink resources. However, if the buffer status report arrives too late in the eNode B, the eNode B needs to signal an additional dynamic uplink grant that will allocate dynamically allocated resources in a TTI after the TTI where the semi-persistently allocated uplink resources are configured. This can result in unnecessary segmentation and delay to the data of the VoIP bearers.

SUMMARY OF THE INVENTION

One object of the invention is to propose a new buffer status reporting scheme that avoids unnecessary grants from the network. Advantageously, this new buffer status reporting scheme should be operable in configurations where one or more semi-persistently scheduled radio bearers are configured for a communication node.

A further object of the invention is to suggest a new handling of the resource usage in systems, where radio resources can be allocated according to different scheduling modes. Advantageously, the new resource usage scheme is co-operating with the new buffer status reporting scheme.

Another object of the invention is to suggest a new scheduling scheme that is taking advantage of the new buffer status reporting scheme and/or handling of the resource usage.

At least one of these objects is solved by the subject matter of the independent claims. Advantageous embodiments are subject to the dependent claims.

One aspect of the invention is related to a transmission scheme for buffer status reports in a mobile communication system. It is assumed that the scheduler of the radio resources of the mobile communication systems can utilize different scheduling modes for allocating radio resource. According to this aspect of the invention, the triggering and/or generation of the status buffer reports takes into account the scheduling mode of the respective radio bearer's data of which available for transmission in a communication node, e.g. a mobile terminal/user equipment. Given that data of a radio bearer is pending for transmission in a communication node, the decision on whether or not to report on the data of the radio bearer in the status buffer report is depending on the radio bearer's scheduling mode and the status thereof. If no radio bearer of which data is available for transmission in a buffer of the communication node is fulfilling given criteria for inclusion to the buffer status report, an empty buffer status report may be sent (e.g. in case of a periodic buffer status report).

According to this aspect of the invention, one embodiment thereof provides a method for transmitting a buffer status report by a communication node in a mobile communication system. The method comprises generating a buffer status report taking into account the scheduling mode of a respective radio bearer and the scheduling mode status of the respective radio bearer to decide whether data of a respective radio bearer is considered in the buffer status report, and transmitting the buffer status report, if there is any radio bearer's data to be considered in the buffer status report. As explained above, if there is no data of any radio bearer considered to fulfil the given set of criteria, the buffer status report is "empty" and is not sent.

Furthermore, also the triggering mechanism of buffer status reports as such (e.g. by some non-periodic event) may consider the scheduling mode. For example, the arrival of new data in a transmission buffer of a communication node may be triggering a buffer status report only, if certain criteria related to the scheduling mode of the radio bearer to which the data belong are fulfilled. For example, if the data arriving in the transmission buffer is data of a semi-persistently scheduled radio bearer and an activated semi-persistent resource allocation is taking into account this semi-persistently scheduled radio bearer, no buffer status report is triggered. In a further example, if a trigger event is depending on data already present in the transmission buffer upon the arrival of new data in the transmission buffer, already present data of semi-persistently scheduled radio bearers considered in the semi-persistent resource allocation buffer in the transmission should not effect the triggering decision.

In an exemplary embodiment, the scheduling modes available include a dynamic scheduling mode in which radio resources are dynamically allocated by dynamic grants and a semi-persistent scheduling mode in which radio resources are allocated on a semi-persistent basis by semi-persistently configured scheduling grants. In this connection, it should be noted that the term semi-persistently scheduled radio bearer refers to a radio bearer carrying data which is applicable to semi-persistent scheduling and which are transmitted on the activated semi-persistently scheduled resources.

In more detail, in this exemplary embodiment of the invention, the activation status of the semi-persistent resource allocation is considered in the generation of the buffer status report, and if the semi-persistent resource allocation is activated, it is further taken into account whether or not respective semi-persistently scheduled bearers are considered in the semi-persistent resource allocation. Hence, in this exemplary embodiment the communication node generating the buffer status report also keeps track of the status of the respective semi-persistently scheduled radio bearers with respect to whether or not the current semi-persistent resource allocation is taking into account data of the respective semi-persistently scheduled radio bearers.

As a result, the buffer status report will not include those radio bearers for which an activated semi-persistent resource allocation is configured and data of which are accounted for in the currently valid semi-persistent resource allocation.

Again formulated differently, data of dynamically scheduled radio bearers is always reported in the buffer status reports as well as data of semi-persistently scheduled radio bearers, which are not taken into account yet in the currently valid semi-persistent resource allocation (e.g. if no data of the radio bearer have been transmitted before, so that the semi-persistent resource allocation is not yet considering the data of the radio bearer). If semi-persistent resource allocation is deactivated the buffer status report will report on data of all radio bearers configured at the communication node.

In one exemplary implementation the following exemplary rules may be defined to decide whether or not data of a given radio bearer is considered in the buffer status report. In one example, the buffer status report does report on data of a respective radio bearer only, if any of the following conditions is not met for the respective radio bearer:

a semi-persistent resource allocation is activated, the radio bearer is a semi-persistently scheduled radio bearer, data of the radio bearer have already been transmitted on the semi-persistently allocated radio resource.

Accordingly, if all rules a), b) and c) are true, the data of the radio bearer is not included to the buffer status report. Furthermore, it should be noted that rule a) is strictly speaking not a per-radio bearer rule, as semi-persistent resource allocation is commonly either activated or deactivated for all radio bearers.

In a further embodiment, the conditions a) through c) are checked for each radio bearer of which data is comprised in the transmission buffer to decide whether or not to consider the respective radio bearer in the buffer status report. In one example, the conditions a) through c) are checked in the order: a)→b)→c), as the checking of the conditions may be interrupted for data of a given bearer, as soon as any condition is not affirmed.

In one further exemplary embodiment of the invention, it is assumed that there is a plurality of radio bearers configured, wherein at least one of the radio bearers is a semi-persistently scheduled radio bearer. Furthermore, it should be noted that buffer status report can for example be generated in response to the arrival of new data in the transmission buffer of the communication node or on a periodic basis.

In another embodiment of the invention, the buffer status reports are sent in the uplink by a mobile terminal (user equipment) to a base station (Node B). In this exemplary embodiment, the mobile terminal may be informed on which of plurality of radio bearers configured at the mobile terminal is/are (a) semi-persistently scheduled radio bearer(s). This may be for example realized during setup of the radio bearer or by assigning the at least one semi-persistently scheduled radio bearer to a predetermined logical channel group. Such predetermined logical channel group may for example only include semi-persistently scheduled radio bearers. For example, the buffer status report may indicate the logical channel groups to which the radio bearer considered in the buffer status report belong, so as to provide the receiving node (typically a Node B comprising the scheduler) with some information on which services (radio bearers) have new data available for transmission. This information may be exploited in a new scheduling mechanism, as will be outlined below in further detail.

Another aspect of the invention is to suggest a new utilization of the allocated radio resources in a mobile communication system, where radio resources can be allocated by means of different scheduling modes. In this respect, a further embodiment of the invention provides a method for generating a transport block for transmission on an allocated radio resource. According to this method, data of at least one radio bearer is multiplexed to a transport block taking into account the scheduling mode of a respective radio bearer and the and scheduling mode status of the respective radio bearer. Furthermore, the multiplexing also takes into account whether the allocated radio resource is a semi-persistently allocated radio resource or a dynamically allocated radio resource. Upon having generated the transport block, same is transmitted on the allocated radio resource.

In one exemplary implementation, it is checked whether the allocated radio resource is a semi-persistently allocated radio resource or a dynamically allocated radio resource. If the allocated radio resource is a dynamically allocated radio resource, the following data of radio bearers are multiplexed to the transport block, as available for transmission:

buffer status reports (e.g. respective MAC control elements comprising the buffer status reports), data of dynamically scheduled radio bearers, data of semi-persistently scheduled radio bearers, if semi-persistent resource allocation has not yet been activated, and data of semi-persistently scheduled radio bearers not considered in the current semi-persistent resource allocation, if semi-persistent resource allocation has been activated.

If the allocated radio resource is a semi-persistently allocated radio resource, data of those semi-persistently scheduled radio bearers are multiplexed to the transport block, as available for transmission, that are considered in the current semi-persistent resource allocation. As available for transmission means that only data of those radio bearers which have data in the transmission buffer may be multiplexed. If no data of a radio bearer is pending for transmission, no data of this can be multiplexed to the transport block.

Using the multiplexing rules as defined above, it can be assured that data of semi-persistently scheduled radio bearers is always transmitted on the semi-persistently allocated resources, if same are (re-)activated and if the respective radio bearer has been already considered in the configured semi-persistently resource allocation. Otherwise, the data of semi-persistently scheduled radio bearers is transmitted via the dynamic resources allocated by dynamic grants.

In a more detailed exemplary implementation according to a further embodiment of the invention, if the allocated radio resource is a semi-persistently allocated radio resource, the step of multiplexing multiplexes data of a semi-persistently scheduled radio bearer to the transport block, as available for transmission, in case data of the semi-persistently scheduled radio bearer has not yet been transmitted on a semi-persistently allocated radio resource in a previous transmission time interval, and in case a (re-) activation of the semi-persistent resource allocation occurred since transmitting data of the semi-persistently scheduled radio bearer on a dynamically allocated radio resource. In this example, it can thus be taken into account in the multiplexing of the data to a transport block for transmission on a semi-persistently scheduled resource, whether or not the semi-persistent resource allocation presently configured has taken into account the data of the semi-persistently scheduled radio bearer.

Furthermore, in another more detailed exemplary implementation, the overwriting of semi-persistently scheduled resources within a transmission time interval (TTI) by dynamic grants may be taken into account. In this exemplary implementation data of all radio bearers is multiplexed to the transport block, as available for transmission, if the allocated radio resource for a given transmission time interval is a semi-persistently allocated radio resource, but a dynamic grant has been received for the transmission time interval, thereby overwriting the semi-persistent resource allocation within the transmission time interval. Hence, in this overwrite situation where the dynamic grant changes ("overwrites") the semi-persistent grant, data of all bearers may be transmitted in the radio resource.

In case there is more data available for transmission in a communication node than can be transmitted in the a allocated radio resource, the multiplexing of the radio bearers may for example take into account the priority of the respective radio bearers to decide on the order in which data of the radio bearers is multiplexed to the transport block.

In a further embodiment of the invention, a resource allocation for the allocated radio resource is received, where the resource allocation indicates the transport block size and the modulation and coding scheme for the transmission of the transport block. Accordingly, the communication node to transmit the transport block will code the transport block according to the modulation and coding scheme to obtain coded data and will modulate the coded data according the modulation and coding scheme to obtain at least one modulation symbol. The at least one modulation symbol is then transmitted on the allocated radio resource.

As indicated above, the method for transmitting a buffer status report according to any exemplary embodiment described herein may be readily combined with the method for generating a transport block for transmission on an allocated radio resource according to any exemplary embodiment described herein. By combining the methods, i.e. the multiplexing of data of radio bearers to a transport block depending on the type of radio resource allocation (dynamic or semi-persistent) in combination with the rules on data of which radio bearers is reported in the buffer status report provides the receiver of buffer status reports and transport blocks, commonly a base station (eNode B), with additional information on the status of the transmitter, commonly a mobile terminal (user equipment), which may be for example exploited in an optimized scheduling, as will be outlined below.

As indicated above, another aspect of the invention is an optimized scheduling of mobile terminals by a base station, which may be inter alia optimized on the (additional) information implicit to the buffer status reports from the mobile terminals and their transmissions on the uplink. Accordingly, a further embodiment of the invention is related to a method for scheduling radio resources in a mobile communication system. The scheduler allocates radio resources to mobile terminal on a dynamic and semi-persistent basis. The scheduler determines the scheduling mode of radio bearers of which data is comprised in a transport block received from the mobile terminal on a dynamically allocated radio resource and reactivates a semi-persistent resource allocation of the mobile terminal (reactivates means that an already activated semi-persistent resource allocation is activated again), based on the scheduling mode of the respective radio bearers of which data is comprised in a transport block.

In more detail and exemplarily considering the multiplexing behaviour as discussed previously herein, if data of a semi-persistently scheduled radio bearer is comprised in the transport block transmitted on a dynamically allocated radio resource, this could be taken as an indication that the semi persistent resource allocation for the mobile terminal is not taking into account data of such radio bearer yet. Accordingly, the scheduler may decide to reactivate the semi-persistent resource allocation to account for the data of semi-persistently scheduled radio bearer (i.e. to change the semi-persistent configuration of radio resources for semi-persistently scheduled radio bearers).

If considering the exemplary case of a semi-persistently scheduled radio bearer carrying an IP-based service employing IP header compression, such as for example VoIP, it may be advantageous if the reactivation of the semi-persistent resource allocation of the mobile terminal is performed upon the data rate of the data of the semi-persistently scheduled radio bearer is in a steady state. In this example, the data of the semi-persistently scheduled radio bearer may be for example transmitted on the dynamically allocated radio resource until the data rate, respectively size of the data packets reaches a steady state.

In a further embodiment of the invention the radio bearers of which data is comprised in a transport block received from the mobile terminal on semi-persistently scheduled radio resource is monitored a the semi-persistent resource allocation of the mobile terminal can be further reactivated or even deactivated based on whether or not a respective semi-persistently scheduled radio bearer configured for the mobile terminal is active or not, i.e. whether its service is generating data for transmission or not.

A further aspect of the invention is the implementation of the different methods described herein in hardware and/or software. Accordingly, another embodiment of the invention relates to a mobile terminal for transmitting a buffer status report in a mobile communication system. The mobile terminal comprises a processing unit for generating a buffer status report taking into account the scheduling mode of a respective radio bearer and status of the scheduling mode to decide whether data of a respective radio bearer is considered in the buffer status report, and a transmitter for transmitting the buffer status report, if there is any radio bearer's data to be considered in the buffer status report.

Furthermore, in a more specific embodiment of the invention, when deciding on whether data of the respective radio bearer is considered in the buffer status report, the processing unit is adapted to take into account:

the activation status of the semi-persistent resource allocation, and if the semi-persistent resource allocation is activated, whether or not a respective semi-persistently scheduled bearer is considered in the presently configured semi-persistent resource allocation.

The mobile terminal according to a further embodiment of the invention further comprises means adapted to perform the steps of the method for transmitting a buffer status report according to any exemplary embodiment described herein.

A further embodiment of the invention provides another mobile terminal that is capable of generating a transport block for transmission on an allocated radio resource. This mobile terminal comprises a multiplexer for multiplexing data of at least one radio bearer to a transport block taking into account the scheduling mode of a respective radio bearer and the and status of the scheduling mode and whether the allocated radio resource is a semi-persistently allocated radio resource or a dynamically allocated radio resource, and a transmitter for transmitting the transport block on the allocated radio resource.

The mobile terminal according to a more specific embodiment of the invention is further comprising a processing unit for checking whether the allocated radio resource is a semi-persistently allocated radio resource or a dynamically allocated radio resource. The mobile terminal's multiplexer is capable of multiplexing to the transport block the following data of radio bearers, as available for transmission, if the allocated radio resource is a dynamically allocated radio resource:

buffer status reports (e.g. respective MAC control elements comprising the buffer status reports), data of dynamically scheduled radio bearers, data of semi-persistently scheduled radio bearers, if semi-persistent resource allocation has not yet been activated, and data of semi-persistently scheduled radio bearers not considered in the current semi-persistent resource allocation, if semi-persistent resource allocation has been activated.

Furthermore if the allocated radio resource is a semi-persistently allocated radio resource, the multiplexer multiplexes data of those semi-persistently scheduled radio bearers to the transport block, as available for transmission, that are considered in the current semi-persistent resource allocation.

In another embodiment of the invention, if the allocated radio resource is a semi-persistently allocated radio resource, the multiplexer of the mobile terminal is multiplexing data of those semi-persistently scheduled radio bearers to the transport block, as available for transmission, data of which has not yet been transmitted on a semi-persistently allocated radio resource previously, in case a reactivation of the semi-persistent resource allocation occurred since transmitting data of said semi-persistently scheduled radio bearer on a dynamically allocated radio resource.

The mobile terminal according to another embodiment of the invention further comprises means to perform the steps of the method for generating a transport block for transmission on an allocated radio resource according to any exemplary embodiment described herein.

Another embodiment of the invention is relating to a scheduling node, such as for example a base station (eNode B), for scheduling radio resources in a mobile communication system. The scheduling node comprises a resource allocation unit for allocating radio resources to mobile terminal on a dynamic and semi-persistent basis, and a processing unit for determining the scheduling mode of radio bearers of which data is comprised in a transport block received from the mobile terminal on a dynamically allocated radio resource. The resource allocation unit is capable of reactivating a semi-persistent resource allocation of the mobile terminal, based on the scheduling mode of the respective radio bearers of which data is comprised in a transport block.

The scheduling node according to a further embodiment of the invention comprises means to perform the steps of the method for scheduling radio resources in a mobile communication system as described in one of the various embodiments of the invention herein.

Moreover, a further embodiment of the invention is related to a computer readable medium storing instructions that, when executed by a processor of a mobile terminal, cause the mobile terminal to transmit a buffer status report by a communication node in a mobile communication system, by generating a buffer status report taking into account the scheduling mode of a respective radio bearer and status of the scheduling mode to decide whether data of a respective radio bearer is considered in the buffer status report, and transmitting the buffer status report, if there is any radio bearer's data to be considered in the buffer status report.

The computer readable medium according another embodiment of the invention is, further storing instructions that, when executed by the processor of the mobile terminal, cause the mobile terminal to perform the steps of the method for transmitting a buffer status report according to any exemplary embodiment described herein.

Another embodiment provides a further computer readable medium storing instructions that, when executed by a processor of a mobile terminal, cause the mobile terminal to generate a transport block for transmission on an allocated radio resource, by multiplexing data of at least one radio bearer to a transport block taking into account the scheduling mode of a respective radio bearer and the and status of the scheduling mode and whether the allocated radio resource is a semi-persistently allocated radio resource or a dynamically allocated radio resource, and transmitting the transport block on the allocated radio resource.

Also this computer readable medium may optionally further store instructions that, when executed by the processor of the mobile terminal, cause the mobile terminal to perform the steps of the method for generating a transport block for transmission on an allocated radio resource according to any exemplary embodiment of the invention described herein.

A computer readable medium according to another embodiment of this invention is storing instructions that, when executed by a processor of a scheduling node, cause the scheduling node to schedule radio resources in a mobile communication system, by allocating radio resources to mobile terminal on a dynamic and semi-persistent basis, determining the scheduling mode of radio bearers of which data is comprised in a transport block received from the mobile terminal on a dynamically allocated radio resource, and reactivating a semi-persistent resource allocation of the mobile terminal, based on the scheduling mode of the respective radio bearers of which data is comprised in a transport block.

The computer readable medium may optionally further store instructions that, when executed by the processor of the scheduling node, cause the scheduling node to perform the method for scheduling radio resources in a mobile communication system according to one of the exemplary embodiments outlined herein.

BRIEF DESCRIPTION OF THE FIGURES

In the following the invention is described in more detail in reference to the attached figures and drawings. Similar or corresponding details in the figures are marked with the same reference numerals.

FIG. 2 shows an exemplary SAE Bearer Architecture, FIGS. 3 and 4 show an exemplary localized allocation and distributed allocation of the uplink bandwidth in a single carrier FDMA scheme.

DETAILED DESCRIPTION OF THE INVENTION

Figure 1:
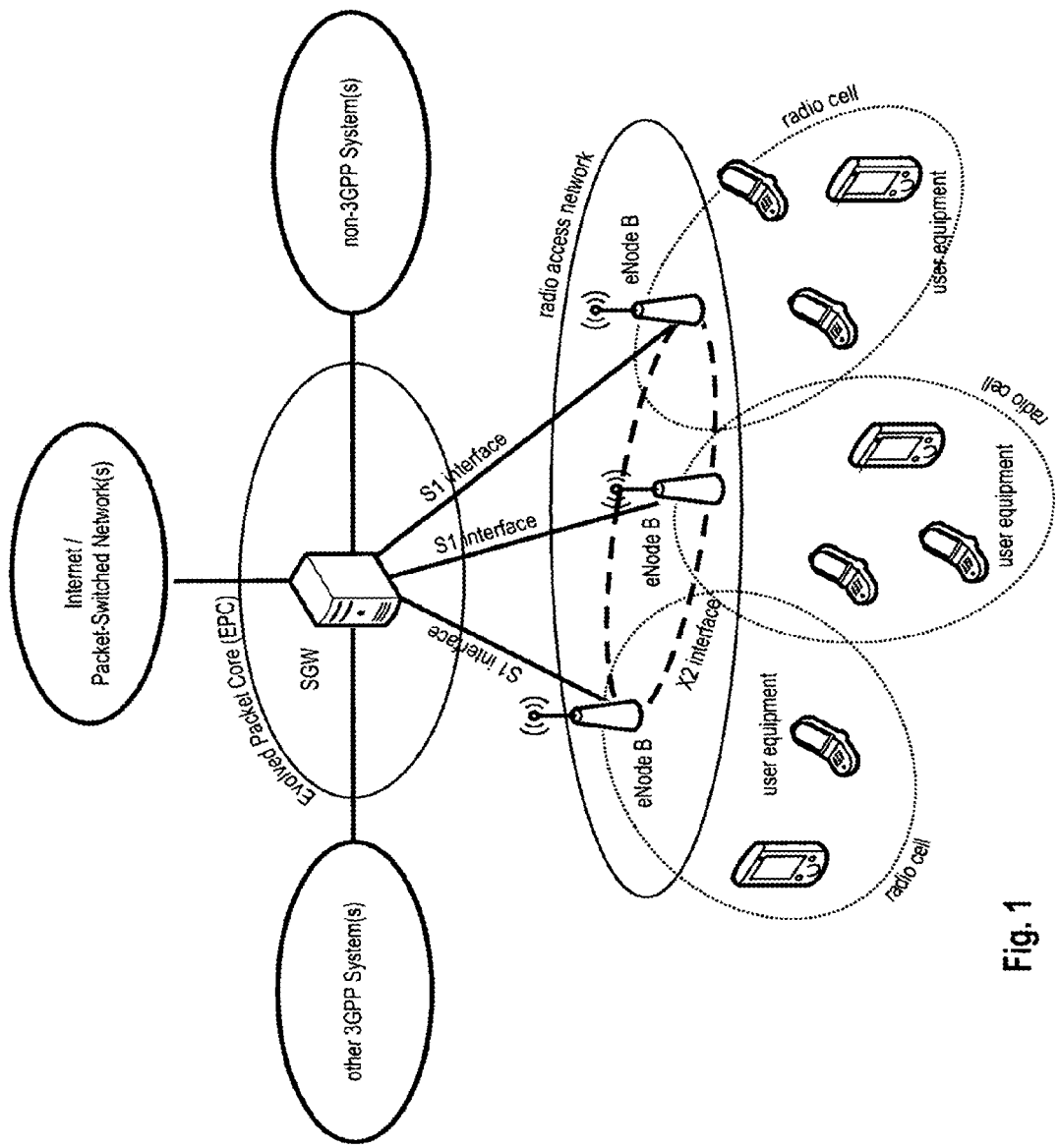
FIG. 1 shows an exemplary network architecture of a SAE/LTE communication system, in which the invention may be utilized.

The following paragraphs will describe various embodiments of the invention. For exemplary purposes only, most of the embodiments are outlined in relation to an orthogonal single-carrier uplink radio access scheme according to the SAE/LTE discussed in the Technical Background section above. It should be noted that the invention may be advantageously used for example in connection with a mobile communication system such as the SAE/LTE communication system previously described, but the invention is not limited to its use in this particular exemplary communication network.

The explanations given in the Technical Background section above are intended to better understand the mostly SAE/LTE specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

One aspect of the invention is related to a transmission scheme for buffer status reports in a mobile communication system. It is assumed that the scheduler of the radio resources of the mobile communication systems can utilize different scheduling modes for allocating radio resource. According to this aspect of the invention, the triggering events for buffer status reports as well as the generation of the buffer status reports takes into account the scheduling mode, e.g. dynamic or semi-persistent scheduling, of the respective radio bearer data of which is available for transmission in a communication node, e.g. mobile terminal/user equipment. Furthermore, the scheduling mode status, e.g. the activation/deactivation of the semi-persistent scheduling, may be further taken into account when deciding on which data of radio bearers is reported in the buffer status report.

In one example, the available scheduling modes for the radio bearers include a dynamic scheduling mode in which radio resources are dynamically allocated by dynamic grants and a semi-persistent scheduling mode in which radio resources are allocated on a semi-persistent basis by semi-persistently configured scheduling grants. In this connection, it should be noted that the term semi-persistently scheduled radio bearer refers to a radio bearer carrying data which is applicable to semi-persistent scheduling and which are transmitted on the activated semi-persistently scheduled resources. Whether or not a semi-persistent resource allocation is utilized by the scheduler for radio bearers carrying data suitable for semi-persistent scheduling is up to the scheduler's decision—of course the scheduler will try to allocate radio bearers carrying data suitable for semi-persistent scheduling on a semi-persistent resource allocation, but this is not mandatory and may be influenced by other scheduling parameters, like channel quality, load, etc.

In line with this example, in one embodiment of the invention, the activation status of the semi-persistent resource allocation is considered in the triggering and generation of the buffer status report, and if the semi-persistent resource allocation is activated, it is further taken into account whether or not respective semi-persistently scheduled bearers are considered in the semi-persistent resource allocation. Hence, in this exemplary embodiment the communication node to transmit buffer status reports also keeps track of the status of the respective semi-persistently scheduled radio bearers with respect to whether or not the current semi-persistent resource allocation is taking into account data of the respective semi-persistently scheduled radio bearers.

Concerning the triggering of buffer status reports, it is proposed that the arrival of new data in a transmission buffer of a communication node is triggering a buffer status report only if certain criteria related to the scheduling mode of the radio bearer to which the data belong. For example, if the data is data of a semi-persistently scheduled radio bearer and an activated semi-persistent resource allocation is taking into account this semi-persistently scheduled radio bearer, no buffer status report is triggered.

It is further proposed that a triggered buffer status report will not include those radio bearers for which an activated semi-persistent resource allocation is configured and data of which are accounted for in the currently valid semi-persistent resource allocation. In other terms, data of dynamically scheduled radio bearers is always reported in the buffer status reports as well as data of semi-persistently scheduled radio bearers, which are not taken into account yet in the currently valid semi-persistent resource allocation (e.g. if no data of the radio bearer have been transmitted before, so that the semi-persistent resource allocation is not yet considering the data of the radio bearer). If semi-persistent resource allocation is deactivated the buffer status report will report on data of all radio bearers configured at the communication node.

Another aspect of the invention is the definition of new multiplexing rules for filling a transport block to be transmitted on an allocated radio resource. Essentially in line with the differentiation of radio bearers based on their scheduling mode and scheduling mode status, also new multiplexing rules can be introduced. The multiplexing rules consider first of all the type of resource allocation. Hence, for each radio resource within a given transmission time interval (TTI), it is considered in the multiplexing of data to a transport block to be transmitted in the given transmission time interval, whether the resource allocation pertaining to this transmission time interval is a dynamic resource allocation (dynamic grant) or is a semi-persistent resource allocation (semi-persistent grant).

If the resource allocation is a semi-persistent resource allocation (which implies that semi-persistent resource allocation is activated), it is ensured that only data of semi-persistently scheduled radio bearers having been considered in the semi-persistent resource allocation is multiplexed to the transport block of the given transmission time interval.

Having been considered means in this context that it is implicit to the semi-persistent resource allocation and its activation that the respective radio bearer has been considered in the semi-persistent resource allocation. For example, as will be outlined below, data of semi-persistent radio bearers transmitting data for the first time are transmitted on dynamic resources first, until the semi-persistent resource allocation is set up or updated, i.e. a new semi-persistent grant is sent (e.g. yielding a larger transport block size as before to account for the radio bearer's data). Upon reception of such a semi-persistent grant adjusting the semi-persistent resource allocation, the data transmitter (e.g. mobile terminal/user equipment) can confirm based on the indicated transport block size that the radio bearer has been taken into account by the scheduler in the semi-persistent resource allocation.

Returning to the multiplexing rules, if the resource allocation is a semi-persistent resource allocation (i.e. the resource allocation is dynamic), data of radio bearers not suited for semi-persistent scheduling (i.e. dynamically scheduled radio bearers) and data of semi-persistently radio bearers not considered in the semi-persistent resource allocation are multiplexed to the transport block for transmission in the given transmission time interval. Semi-persistently radio bearers not yet considered in the semi-persistent resource allocation are for example data of radio bearers that for which have not yet provided data previously, so that the scheduler is not yet aware of the radio bearer sending data and consequently the radio bearer is not yet considered in the resource allocation of the currently valid semi-persistent grant.

Furthermore, it should be noted that in case semi-persistent resource allocation is not activated, data of all radio bearers is transmitted on the dynamically allocated resources. In addition, it should also be noted that in all cases the transport block may be filled with data according to the logical channel priorities of the logical channels to which the respective radio bearers are mapped. If properly configured, the transport block size of the semi-persistent resource allocation should be such that all data of semi-persistently scheduled radio bearers (considered in the semi-persistent grant) becoming available for transmission in between two transmission time intervals in which semi-persistent resources are allocated can be transmitted in the given transmission time interval.

As already briefly indicated above, another aspect of the invention is related to exploiting the additional information gained by the data receiver from the above outlined rules for sending buffer status reports and filling transport blocks. For example considering that the buffer status reports will only report on data of radio bearers requiring a dynamic grant, there is no longer any ambiguity with respect to the question whether or not the buffer status report has been triggered by data of a semi-persistently scheduled radio bearer which is already considered in the currently activated and configured semi-persistent resource allocation. Accordingly, unnecessary resource allocations can be avoided in scenarios discussed in the Technical Background section of this document. Furthermore, by monitoring data of which bearers is transmitted on the dynamically allocated radio resources, the data receiver (e.g. base station/eNode B) which is including the scheduler in this example can also detect semi-persistently scheduled radio bearers becoming active (i.e. producing data). If data of a semi-persistently scheduled radio bearer is detected in a transport block sent on a dynamically allocated radio resource, the data receiver (scheduler) can assume that this radio bearer has not yet been accounted for yet in the semi-persistent resource allocation and could activate the semi-persistent resource allocation with an updated semi-persistent grant to account for the additional data of the now active semi-persistently scheduled radio bearer.

Similarly, when monitoring the transport blocks on the semi-persistently allocated radio resources, the data receiver (scheduler) can detect which semi-persistently scheduled radio bearers are active and send data. If it is detected that a service of a semi-persistently scheduled radio bearer becomes inactive (e.g. no data of the semi-persistently scheduled radio bearer is sent for a given threshold number of transmission time intervals in which semi-persistently allocated radio resources are configured), the data receiver (scheduler) could decide to change (in this case reduce) the semi-persistent grant (in this case reduce the transport block size) to account for a radio bearer becoming inactive.

In a more specific implementation according to one exemplary embodiment of the invention, one or more of the semi-persistently scheduled radio bearers convey IP packets of a service and employ IP header compression, as for example suggested in IETF RFC 3095, to compress the IP headers. Furthermore, it may be assumed that this at least one semi-persistently scheduled radio bearer periodically generates IP packets relatively constant in size, so that after header compression is in a steady state a relatively constant bit rate stream is produced. One example for such service would be VoIP, as mentioned before. In this case the size of the IP packets transported via the radio bearer may be varying until IP header compression reaches its steady state and produces "quasi-static" packet sizes. In order to optimize resource allocation for such type of services, the data receiver (scheduler), e.g. in the base station/eNode B, may therefore await the data of a radio bearer conveying such type of service (i.e. the IP packets to which header compression has been applied) to reach a steady state before considering same in a semi-persistent resource allocation.

For example, if the base station/eNode B (scheduler) detects data of semi-persistently scheduled radio bearer conveying a VoIP service being transmitted by a mobile terminal/user equipment on dynamically allocated resources, the base station/eNode B (scheduler) may not immediately update the semi-persistent resource allocation, but may await the data to reach a steady state, e.g. when the data of the radio bearer have a quasi-static data rate before updating the semi-persistent resource allocation.

All aspects of the invention described above are based on a differentiation of the radio bearer with respect to their scheduling mode being possible in the data transmitter and data receiver, e.g. the mobile terminal/user equipment and base station/eNode B, respectively, for uplink data transmissions. In one embodiment of the invention, the data transmitter is informed by the data receiver on the scheduling mode of the respective radio bearers established between the data transmitter and data receiver. For example, if considering an uplink scenario, the base station/eNode B could indicate the scheduling mode in a signaling message exchanged with the mobile terminal/user equipment during radio bearer setup. In a 3GPP system and assuming that there are two scheduling modes available, dynamic resource allocation and semi-persistent resource allocation, this could be accomplished by adding an additional information element (IE)—one flag would be sufficient in this case—to the radio bearer setup message of the RRC protocol that indicates whether the respective radio bearer to which the radio bearer setup message pertains is carrying data which may be scheduled by the base station/eNode B using semi-persistent resource allocation.

Another option may be to designate one of the available logical channel groups (LCGs) to which the radio bearers are assigned as a logical channel group to which only semi-persistent scheduled radio bearers are assigned. Accordingly, by indicating a radio bearer to be assigned to this predetermined logical channel group during radio bearer setup, the mobile terminal/user equipment is implicitly informed on the radio bearer being potentially scheduled by using semi-persistent resource allocation.

Regarding the triggering of a buffer status report, in one exemplary embodiment of the invention, the arrival of new data of semi-persistently scheduled radio bearers in the transmission buffer of a communication node (e.g. mobile terminal/user equipment) that are considered in an activated semi-persistent resource allocation are not triggering a buffer status report. Accordingly, once data becomes available on radio bearer and arrives in an empty transmission buffer of the communication node, the communication node will first check the following conditions:

Is semi-persistent resource allocation activated?

Is the radio bearer of which data arrived in the transmission buffer a semi-persistently scheduled radio bearer?

Has data of the radio bearer of which new data arrived in the transmission buffer already been transmitted on the semi-persistently allocated radio resource?

If the above conditions are all true, the buffered data of the radio bearer is not considered for buffer status reporting. If one of the conditions above is not met for the data of the radio bearer arriving in the transmission buffer, a buffer status report is triggered.

Furthermore, it should be noted that also other triggering events defined in the system may need to be adapted. Generally, the triggering events depending on the arrival of data in a transmission buffer should not consider (data of) semi-persistent scheduled radio bearers being considered in an active semi-persistent resource allocation.

For example, consider a trigger event according to which data of a logical channel/radio bearer in the transmission buffer trigger a buffer status report, if there is only data of radio bearers having a lower logical channel priority in the transmission buffer. In this example, there will be no buffer status report, if higher priority data of a semi-persistent scheduled radio bearers being considered in an active semi-persistent resource allocation (which did not trigger a buffer status report) is already present in the transmission buffer. Accordingly, this trigger event should be improved such that data of a logical channel/radio bearer in the transmission buffer trigger a buffer status report, if there is only data of dynamically scheduled radio bearers and semi-persistently scheduled radio bearers not considered in an active semi-persistent resource allocation in the transmission buffer having a lower logical channel priority.

In one exemplary embodiment of the invention, the trigger events for a buffer status report in a 3GPP LTE system can be redefined as follows. A buffer status report is thus triggered if (note that the terms logical channel and radio bearer can be considered synonyms in these events, as it is assumed that data of a radio bearer is mapped to one logical channel, so that there is a one-to-one mapping between logical channels and radio bearers):

Uplink data, for a logical channel not being considered in a currently valid semi-persistent grant and which belongs to a Logical Channel Group (LCG), becomes available for transmission in the RLC (Radio Link Control) or PDCP (Packet Data Convergence Protocol). Furthermore, the data belongs to a logical channel with higher priority than the priorities of the logical channels for which data is already available for transmission and which are not considered in a currently valid semi-persistent grant. A "Regular BSR" is triggered in this case.

Uplink resources are allocated and the number of padding bits in the transport block (MAC PDU) is equal to or larger than the size of the Buffer Status Report MAC control element. A "Padding BSR" is triggered in this case.

A serving cell change occurs. A "Regular BSR" is triggered in this case.

Furthermore, a (periodic) buffer status report is also triggered by the expiry of the following timers:

when the RETX_BSR_TIMER expires and the UE has data available for transmission a "Regular BSR" is triggered.

when PERIODIC_BSR_TIMER expires, a "Periodic BSR" is triggered.

If there is a buffer status report triggered by any event, the communication node will check whether there are any uplink resources available for the transmission of the buffer status report. If not, the communication node sends a scheduling request to be allocated an uplink resource on which the buffer status report can be sent. Considering for example, where the mobile terminal/user equipment is to send a buffer status report, and there are no PUSCH resources allocated to the mobile terminal/user equipment, the mobile terminal/user equipment transmits a scheduling request to the base station/eNode B to request the dynamic allocation of a PUSCH resource.

In one exemplary embodiment of the invention, buffer status reports may not be sent on radio resources that have been allocated on a semi-persistent basis, but the communication node that is to transmit the buffer status report will use only dynamically allocated radio resources for sending the buffer status report. Alternatively, in another embodiment of the invention, buffer status report may be transmitted on semi-persistently scheduled radio resources as well as on dynamically allocated radio resources Next, an exemplary embodiment of the invention related to the generation of buffer status reports will be described with respect to FIG. 5. Generally, a buffer status report reports on the data within the transmission buffer obeying the rules on data of which radio bearers is to be considered as outlined herein. In one exemplary embodiment, the size of the data in the transmission buffer is reported on a per-logical channel group basis. Hence, the data size reported for a particular logical channel group considered the data of the radio bearers belonging to the respective logical channel group and which are to be considered according to the rules defined herein.

The buffer status report may for example report on one or more individual (not all) logical channel groups (short or truncated BSR). In this case the a report for a logical channel group within the buffer status report consists of field for indicating the a logical channel group reported (logical channel group identifier—LCG ID) and a field for indicating the size of the data in the transmission buffer for those radio bearers belonging to the logical channel group and to be considered in the buffer status reporting. If all logical channel groups are reported (long BSR), no logical channel group identifiers need to be included to the buffer status report but the report may contain only the size of the data in the transmission buffer for those radio bearers belonging to the logical channel group and to be considered in the buffer status reporting for each logical channel group. The buffer status report can be for example sent as a MAC control element.

Figure 5:
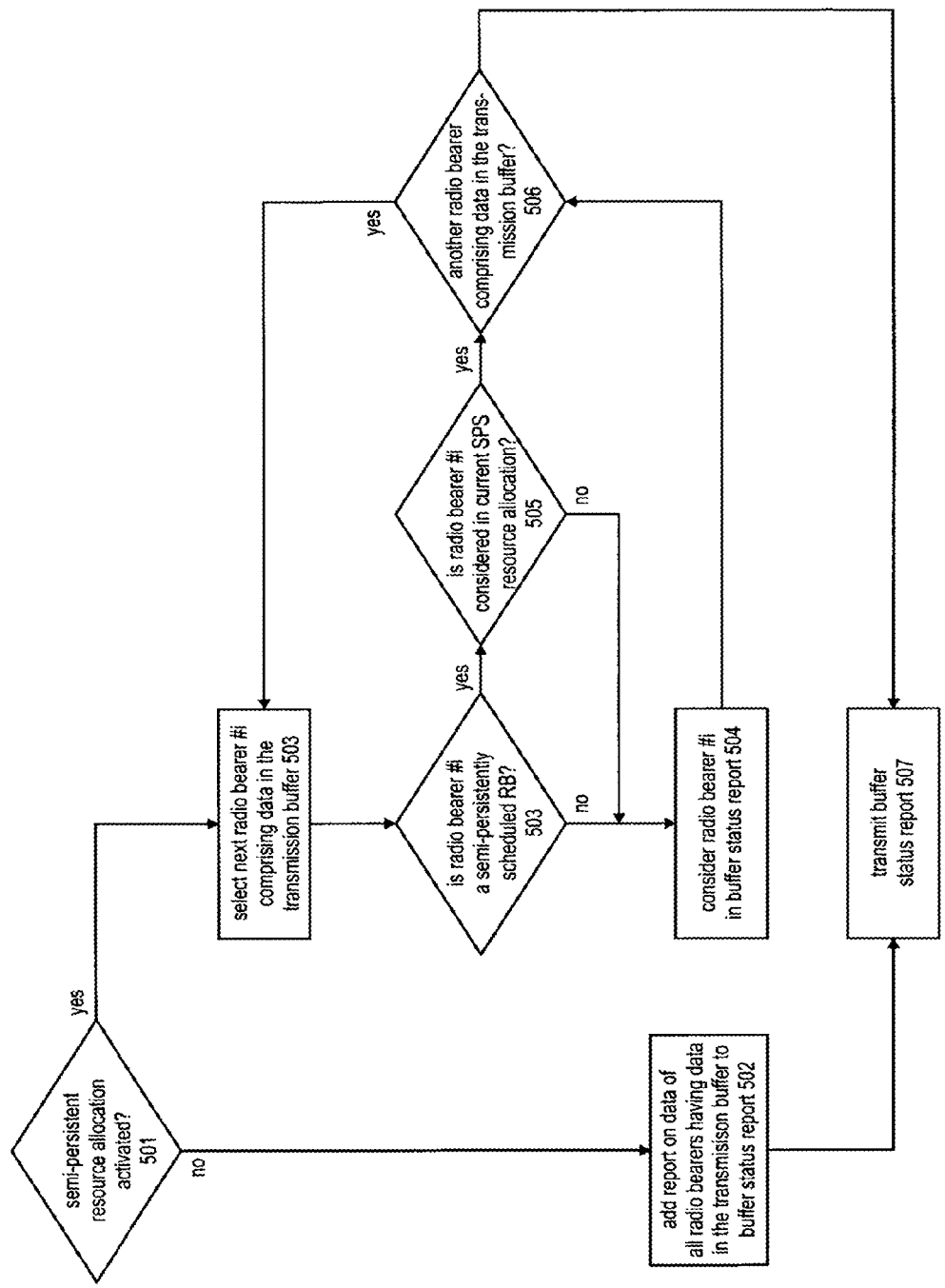
FIG. 5 shows a flow chart of a procedure for generating a triggered buffer status report in a mobile communication system according to one exemplary embodiment of the invention.

FIG. 5 shows a flow chart of a procedure for generating and (optionally) transmitting a buffer status report in a mobile communication system according to one exemplary embodiment of the invention. The procedure shown in FIG. 5 may be for example performed by a mobile terminal/user equipment if considering uplink data transmissions.

In FIG. 5 it is assumed that some event, like the arrival of new higher priority data in a transmission buffer of a mobile terminal/user equipment or expiry of a timer for triggering periodic buffer status reports, has triggered the generation of a buffer status report. For exemplary purposes, the communication node to send the buffer status report on the uplink data in its transmission buffer is a mobile terminal/user equipment and it is further assumed that there are two scheduling modes for scheduling uplink resources, a dynamic scheduling mode in which radio resources are dynamically allocated by dynamic grants and a semi-persistent scheduling mode in which radio resources are allocated on a semi-persistent basis by semi-persistently configured scheduling grants.

In this example, it is exemplarily assumed that a full buffer status report on radio bearers of all logical channel groups is to be sent. The following procedure may also be applied to situations where a buffer report for only one (or not all) logical channel group(s) should be sent—in this case, only radio bearers of the respective logical channel group(s) need to be evaluated by the following procedure.

For generating the buffer status report, the mobile terminal/user equipment checks 501 whether semi-persistent resource allocation is activated or not. If this is not the case, the mobile terminal/user equipment adds 502 data of any radio bearer having data in the transmission buffer to the buffer status report. If the buffer status report is intended to be limited to report on one or more logical channel group, the only data of those radio bearers belonging to the desired logical channel group(s) are added to the buffer status report. Subsequently, the buffer status report can be transmitted 507 on the next uplink resource allocated to the mobile terminal/user equipment. The buffer status is transmitted via the PUSCH, whereby the buffer status report is multiplexed to the transport block with other uplink data.

If semi-persistent resource allocation is activated, the mobile terminal/user equipment will consider for each radio bearer having data in the transmission buffer whether to report on its data in the transmission buffer as follows. The mobile terminal/user equipment selects 503 a radio bearer #i from the radio bearer having data in the transmission buffer and checks 503 whether this radio bearer #i is a semi-persistently scheduled radio bearer. If this is not the case, i.e. radio bearer #i is a dynamically scheduled radio bearer, the mobile terminal/user equipment considers 504 radio bearer #i in its reporting, e.g. the data of radio bearer #i in the transmission buffer is considered for the logical channel group to which radio bearer #i belongs.

Otherwise, if radio bearer #i is a semi-persistently scheduled radio bearer, the mobile terminal/user equipment next checks 505 whether radio bearer #i is already considered in the currently valid semi-persistent resource allocation. This may be for example accomplished by keeping a flag for each semi-persistently scheduled radio bearer indicating this circumstance. The flag may be for example set to indicate the radio bearer #i being considered in the currently valid semi-persistent resource allocation, if a new activation (also herein referred to as "reactivation") of the semi-persistent resource allocation has occurred (i.e. a new semi-persistent grant has been received) after having sent data of a radio bearer on dynamically allocated resources.

If radio bearer #i is not considered in the currently valid semi-persistent resource allocation, e.g. the corresponding flag is not set, radio bearer #i considered 504 in the buffer status report as the dynamically scheduled radio bearers. Otherwise, when radio bearer #i is already considered in the currently valid semi-persistent resource allocation, no reporting on its data in the transmission buffer is done, since the mobile terminal/user equipment can assume that the currently valid and active semi-persistent resource allocation already allocates sufficient resources for transmitting data of radio bearer #i.

If there is 506 at least one further radio bearer having data in the transmission buffer, the procedure returns to step 503, where the next radio bearer is selected. Effectively, steps 503 and 505 (and step 504 as applicable) are repeated for all radio bearers having data in the transmission buffer of the mobile terminal/user equipment. The order in which the individual radio bearers having data in the transmission buffer are processed may be for example based on the logical channel groups they belong to. For example, if the buffer status report is reporting on a logical channel group basis, it may be advantageous to process the radio bearers of one logical channel group one after another as defined above and to sum the size of their data in the transmission buffer (for those radio bearers to be considered in the reporting) to report one single data size per logical channel group.

In this connection, it should be noted that in case the mobile terminal/user equipment has only (one or more) radio bearers configured that are all considered and transmitted on an activated semi-persistent resource allocation, periodic buffer status reports will indicate no data in the mobile terminal's/user equipment's transmission buffer being pending for uplink transmission.

Next, another aspect of the invention, the utilization of the granted radio resources and more specifically new multiplexing rules for transmitting the data of radio bearers that can be scheduled according to different scheduling modes will be discussed in further detail. One feature of this aspect of the invention is that there is a differentiation of allocated uplink resources based on the allocation type, i.e. the respective scheduling mode. Furthermore, the utilization of the allocated radio resources may also take into account the scheduling mode of the different radio bearers having data pending for transmission.

For exemplary purposes, this feature will be outlined assuming that radio resources can be scheduled dynamically or on a semi-persistent basis as discussed previously herein. Every time new data of a radio bearer arrives in the transmission buffer which is of higher priority than the data already available in the transmission buffer of the transmitting communication node (e.g. a mobile terminal/user equipment) upon a transmission opportunity in the uplink occurring (i.e. there is a transmission time interval where the communication node is allocated radio resources), the communication node performs further checks to determine which data pending in the transmission buffer will be transmitted. First of all, the communication node checks 601, whether the resource allocated within the transmission time interval has been allocated by a dynamic grant (i.e. is dynamically allocated) or has been allocated by a semi-persistent grant (i.e. by a semi-persistent resource allocation). Please note that in case there is resource in the given transmission time interval that has been allocated by a semi-persistent grant, this also implies that semi-persistent resource allocation has been activated.

If the radio resource is a semi-persistently scheduled resource, the communication node only transmits data of radio bearers that are suitable for semi-persistent scheduling and are considered in the currently valid and activated semi-persistent grant. In this exemplary embodiment of the invention, this is realized by the communication node first selects 602 a semi-persistently scheduled (SPS) radio bearer #i having data in the transmission buffer (e.g. the SPS radio bearer could be selected according to their logical channel priority) and checks 603, whether SPS radio bearer #i is considered in the currently valid semi-persistent grant (SPS resource allocation). If this should be the case, the data of SPS radio bearer #i is added 604 (multiplexed) to the transport block.

If SPS radio bearer #i is not considered in the currently valid semi-persistent grant or after the data of SPS radio bearer #i having been added to the transport block, the communication node determines 605, whether the there is a further semi-persistently scheduled radio bearer having data in the transmission buffer. If so, the communication node jumps back to step 602 and selects the next semi-persistently scheduled radio bearer having data in the transmission buffer (e.g. again based on the logical channel priority) and processes this next semi-persistently scheduled radio bearer as described above. Upon having filled the transport block, same is transmitted 606 on the allocated semi-persistently allocated resource.

If it is determined in step 601 that the allocated radio resource in the transmission time interval is dynamically allocated by a dynamic grant, it is next checked 607 whether any buffer status report is pending for transmission. If so, the buffer status report is added 608 to the transport block. In one exemplary implementation, the transport block is corresponding to a PDU (Protocol Data Unit) of the MAC entity (Medium Access Control entity) and the buffer status report is comprised to the MAC PDU's header as a BSR control element.

If there is no buffer status to be reported or after having added 608 the buffer status report to the transport block, it is next iterated through the radio bearers having data in the transmission buffer and data of dynamically scheduled radio bearers is added to the transport block. Furthermore, if semi-persistent resource allocation is activated, also data of semi-persistently scheduled radio bearers not considered in the activated semi-persistent resource allocation is added to the transport block. If semi-persistent resource allocation is deactivated, data of all semi-persistently scheduled radio bearers is added to the transport block as available in the transmission buffer (in this example, semi-persistent resource allocation being deactivated is equivalent to no radio bearer being considered in the semi-persistent resource allocation).

One possible exemplary implementation of this procedure may be realized as follows. The communication node selects 609 a radio bearer #i from the radio bearers having data in the transmission buffer and checks 610 next, whether radio bearer #i is dynamically scheduled or semi-persistently scheduled. If radio bearer #i is not a semi-persistently scheduled radio bearer, the data of radio bearer #i is added 612 to the transport block. If radio bearer #i is a semi-persistently scheduled radio bearer, it is further determined 611, whether radio bearer #i is considered in the current semi-persistent resource allocation or not. In this respect it should be noted that this determination yields "no" for all semi-persistently scheduled radio bearers, if semi-persistently scheduling is deactivated (In this context it should be noted that a semi-persistently resource allocation may be configured (e.g. the periodicity of the allocation), but the configured resources are not yet known since semi-persistently scheduling is not activated (i.e. no semi-persistent grant has been sent yet to active the semi-persistent resource allocation). Hence, the configuration and (de-)activation of semi-persistent scheduling is independent). If semi-persistently scheduling is activated this determination yields "yes" for those semi-persistently scheduled radio bearers that are considered in the current semi-persistent resource allocation (respectively currently valid semi-persistent grant).

If the determination in step 611 yields "yes" (which also yields semi-persistent scheduling being activated), data of respective radio bearer #i within the transmission buffer is not included to the transport block. If the determination in step 611 yields "no" data of respective radio bearer #i within the transmission buffer is included 612 to the transport block.

Step 613 assures that all radio bearers having data in the transmission buffer are checked and processed according to the rules outlined above. If all radio bearers having data in the transmission buffer have been processed, the transport block can be sent 606 on the allocated dynamic resource.

The multiplexing behavior for filling the transport block to be transmitted may be summarized as follows:

If the allocated radio resource is a dynamically allocated radio resource the following data can be multiplexed to the transport block:

MAC control elements, including buffer status reports, as available for transmission, data of dynamically scheduled radio bearers, if semi-persistent resource allocation has not yet been activated, data of all semi-persistently scheduled radio bearers, and if semi-persistent resource allocation has been activated, data of semi-persistently scheduled radio bearers not considered in the current semi-persistently resource allocation (respectively semi-persistent grant), are multiplexed to a transport block, as available. If the allocated radio resource is a semi-persistently allocated radio resource, the multiplexer of the communication node multiplexes data of those semi-persistently scheduled radio bearers to the transport block which are already considered in the currently valid semi-persistent resource allocation (alternatively: the multiplexer of the communication node multiplexes data of those semi-persistently scheduled radio bearers to the transport block data of which have previously been transmitted via a semi-persistently allocated radio resource in a previous transmission time interval).

Figure 6:
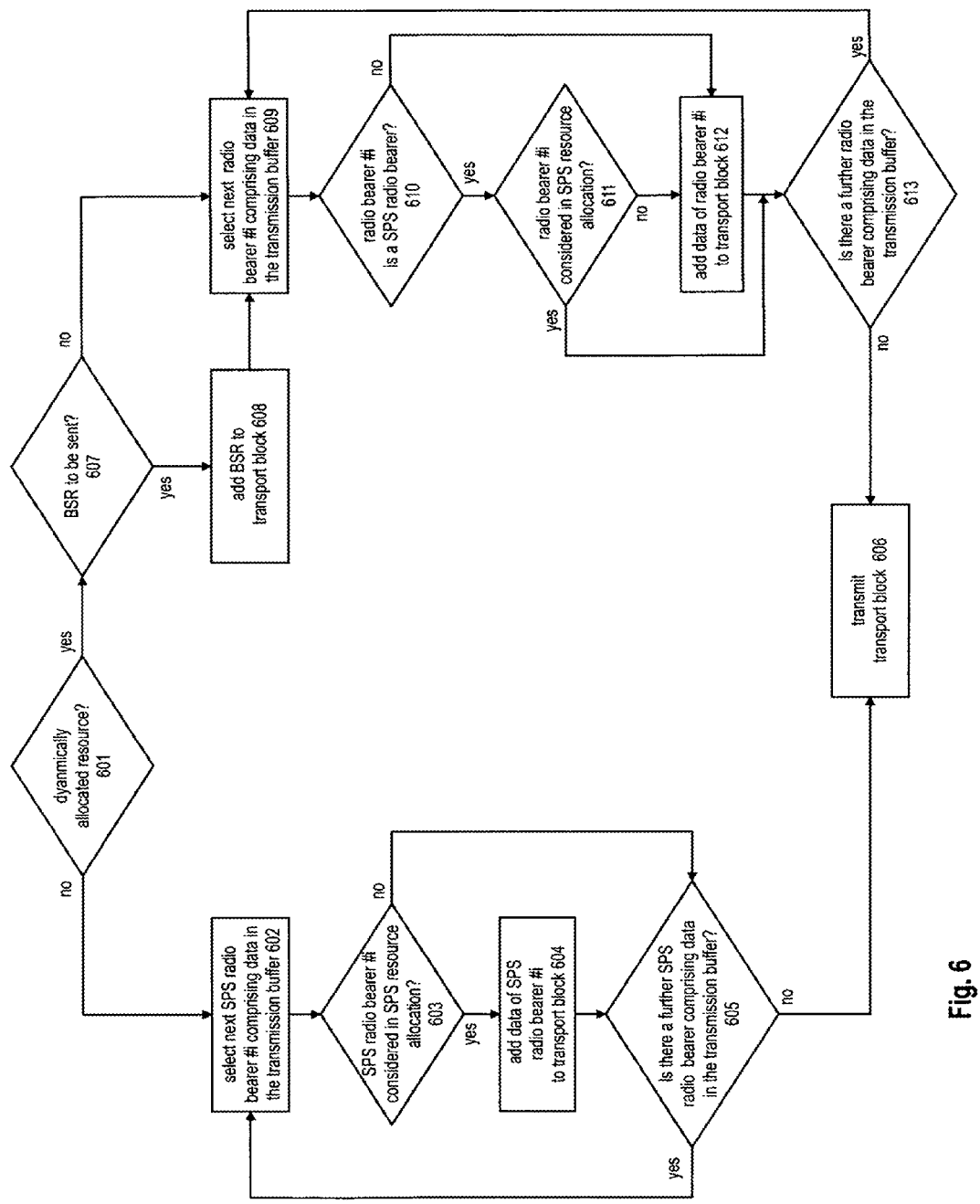
FIG. 6 shows a flow chart of a procedure for multiplexing data to a transport block for transmission on an allocated radio resource according to an exemplary embodiment of the invention.
Figure 7:
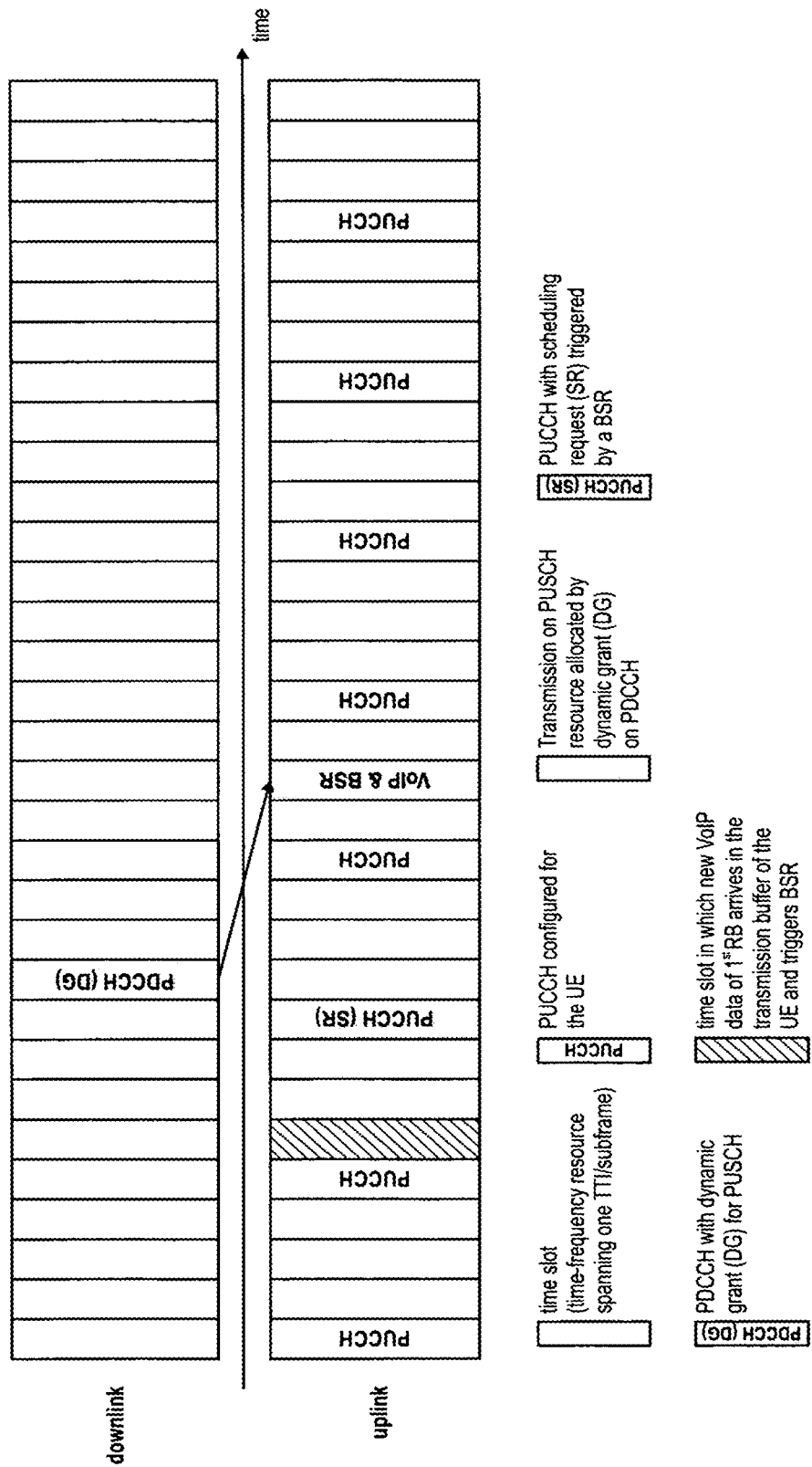
FIG. 7 shows exemplary triggering and transmission of a buffer status report in a 3GPP LTE system.
Figure 8:
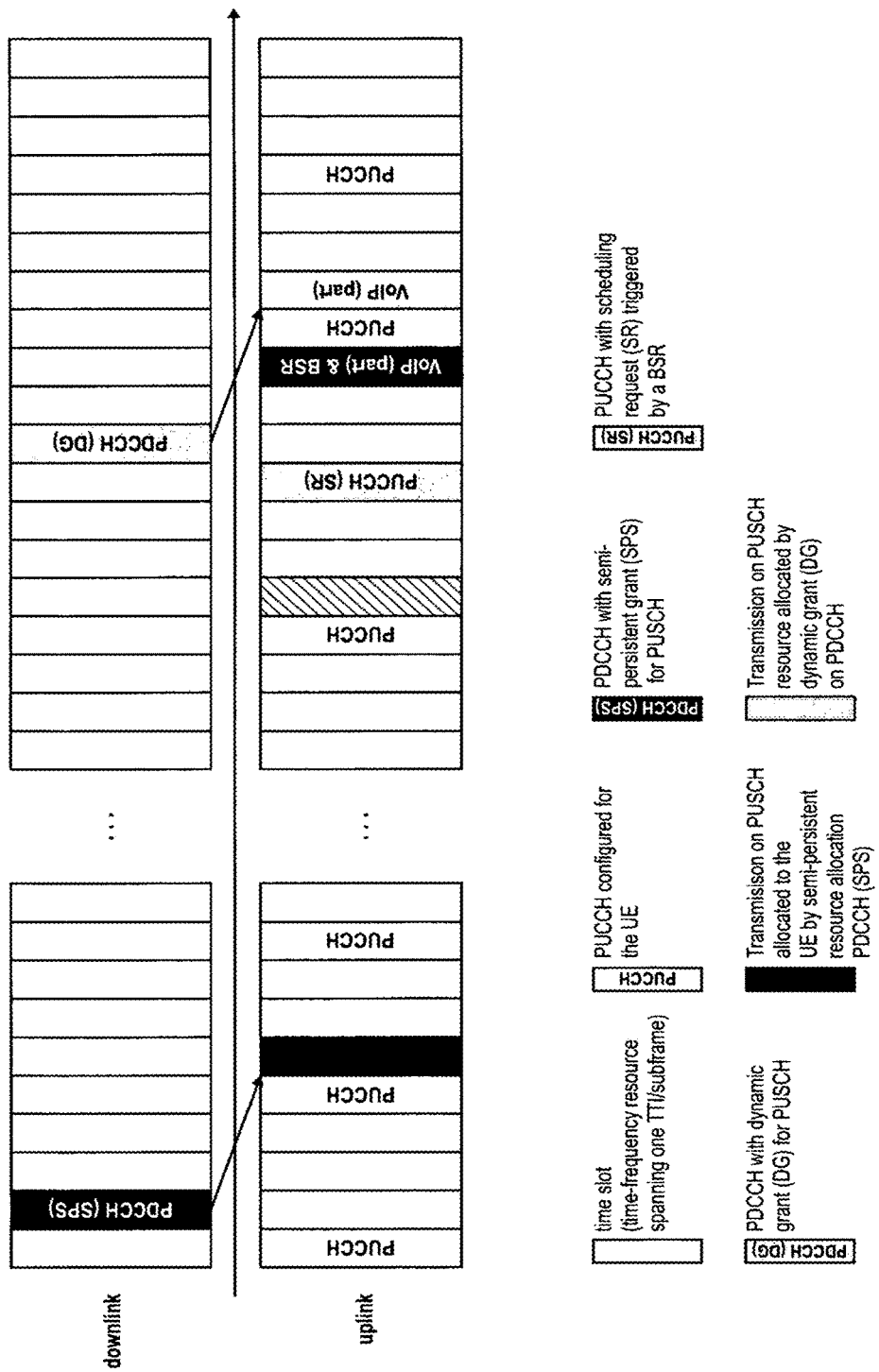
FIGS. 8 & 9 show exemplary uplink data transmissions and related buffer status reporting in an 3GPP LTE system, where unnecessary resource allocation occurs.
Figure 9:
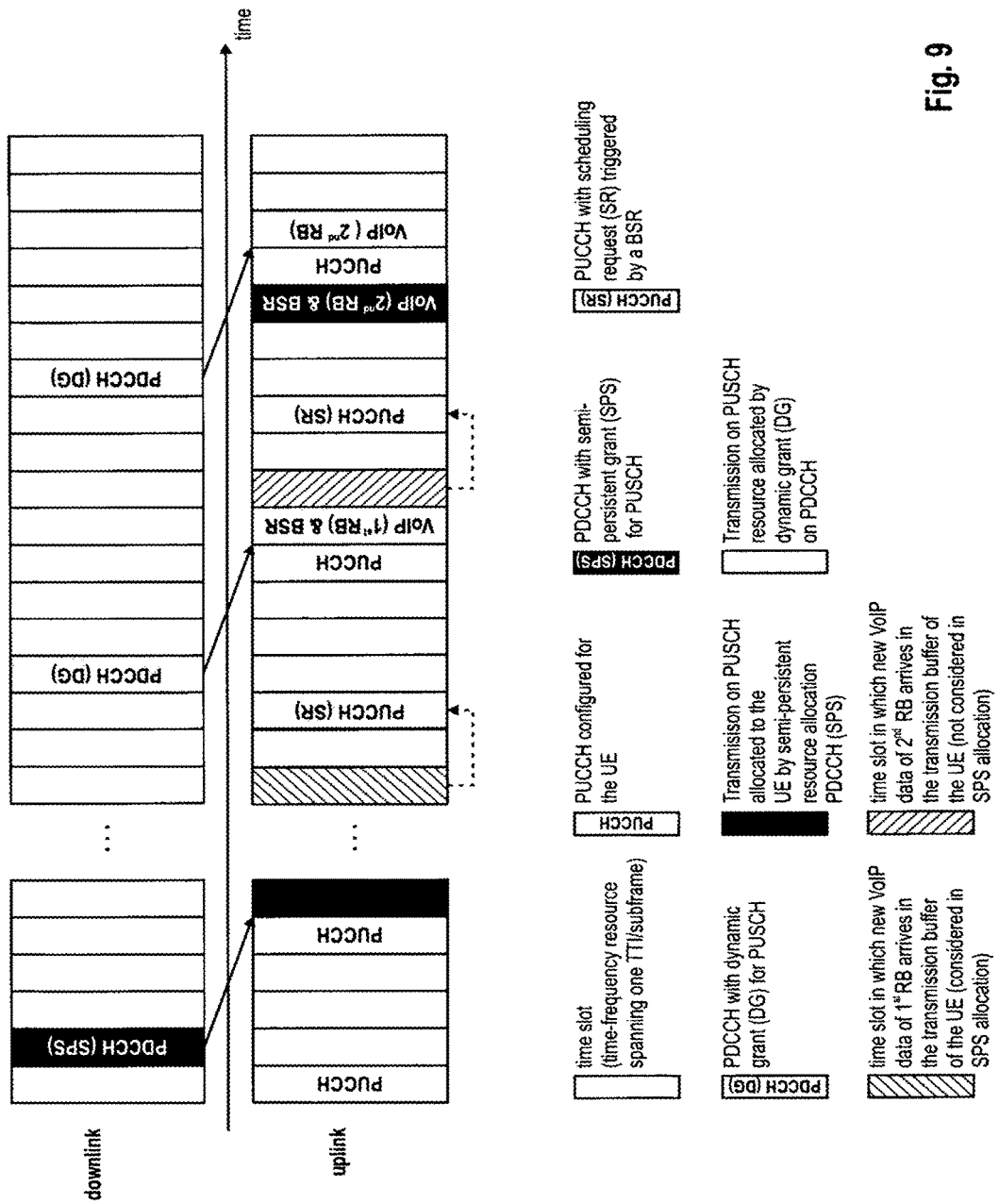

Furthermore, it should be noted that in the exemplary embodiment of the invention discussed with respect to FIG. 6 above, buffer status reports are transmitted only on dynamically allocated resources.

Generally, it should be noted that the transport block size of a resource allocation is limited. In a well implemented semi-persistent resource allocation, the transport block size is chosen by the scheduler such that the data of all semi-persistently scheduled radio bearers considered in the semi-persistent resource allocation fits into the transport block. If for whatever reason some data of a semi-persistently scheduled radio bearer considered in the semi-persistent resource allocation should not fit into the (remaining bits of) the transport block, segmentation of the data can be used to fill the remaining bits of) the transport block with at least a part of the data of the semi-persistently scheduled radio bearer pending in the transmission buffer.

Although harder to accomplish, also the dynamic resource allocation should be implemented ideally such that the communication node can transmit data of all radio bearers pending for transmission (according to the multiplexing rules above) within a single transport block. As this is somewhat more difficult to accomplish in view of the less regular data size of services not suitable for semi-persistent resource allocation (given that the scheduler does also not want to constantly allocate transport block sizes extending the data size available for transmission by far), segmentation of individual data packets from a radio bearer may occur more frequently for dynamic resource allocations.

The above rules for multiplexing the data of different configured radio bearers to a transport block may be alternatively formulated as follows. In another exemplary embodiment the following determinations and steps are performed (for uplink transmissions):

If data is not from a semi-persistently scheduled radio bearer: This data may only be included in a transport block that is transmitted during a TTI with dynamic uplink resources If data is from a semi-persistently scheduled radio bearer:

If semi-persistently scheduling has not been activated: This data may be included in a transport block that is transmitted during a TTI with dynamic uplink resources.

If semi-persistently scheduling has been activated:

If the activation/reactivation of the semi-persistently scheduled resources happened after data became available on the semi-persistently scheduled radio bearer: This data may only be included in a transport block that is transmitted during a TTI where semi-persistent uplink resources are configured. The data is not allowed to be included in a transport block that is transmitted during a TTI with dynamic uplink resources.

If there was no reactivation of semi-persistently scheduling yet, even though data became available on the semi-persistently scheduled radio bearer: If semi-persistently scheduling is already activated, the data may not be included in a transport block that is transmitted during a TTI where semi-persistent uplink resources are configured. However, the data may be included in a transport block that is transmitted during a TTI with dynamic uplink resources.

Figure 10:
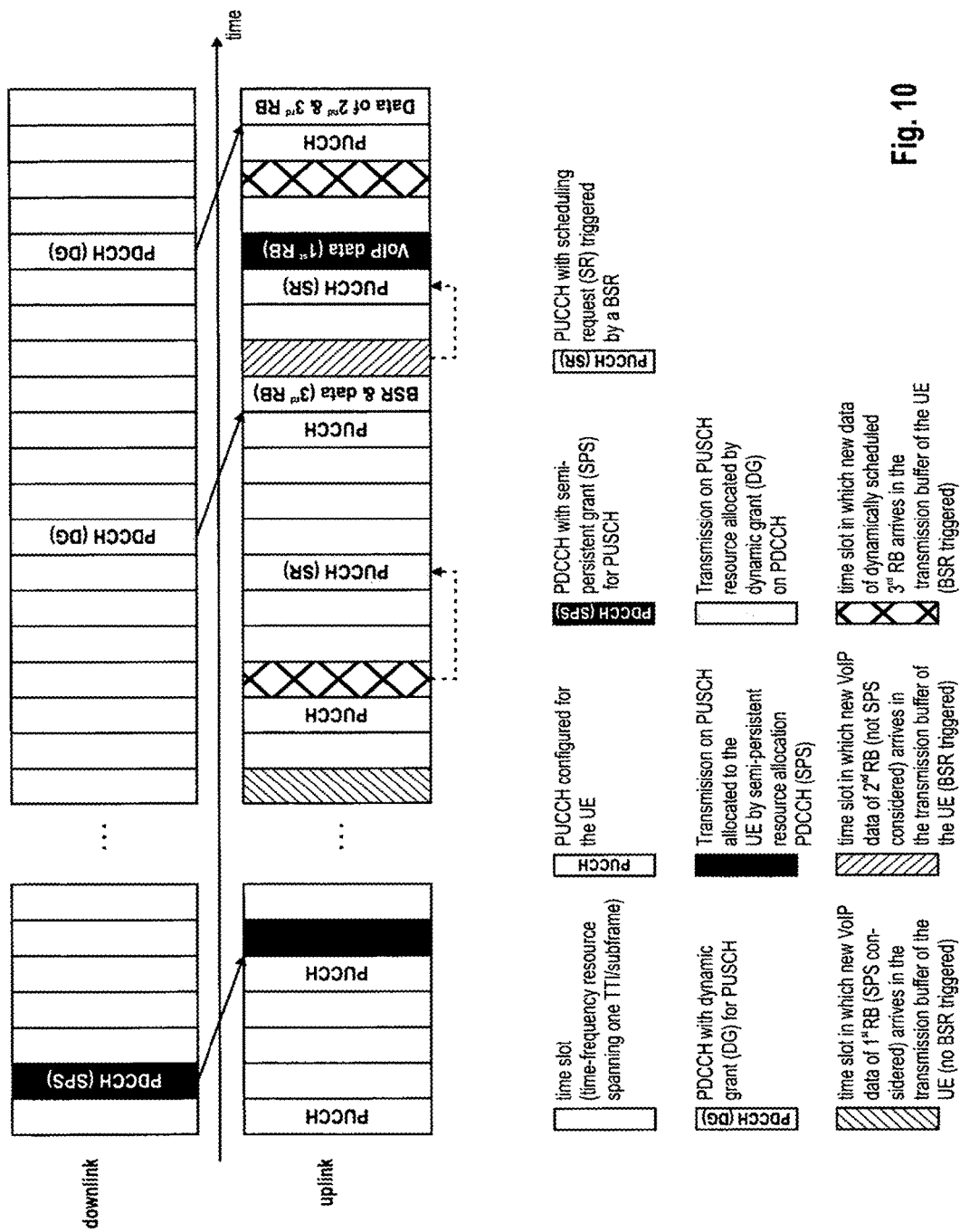
FIG. 10 shows an exemplary transmission of uplink data according to an embodiment of the invention, used for highlighting the advantageous effects obtained by employing the concepts of the invention.

Next, an exemplary embodiment of the invention will be described with respect to FIG. 10. FIG. 10 is showing an exemplary transmission of data (and buffer status reports) according to the improved procedures for triggering and transmitting buffer status reports and for multiplexing data on allocated resources described herein. For exemplary purposes it is referred to uplink data transmission by a user equipment to a eNode B (comprising the scheduling entity) within an improved 3GPP LTE mobile communication system. In this example, it is assumed that the user equipment (UE) has set up two VoIP services so that two semi-persistently scheduled radio bearers ("VoIP bearers") are configured in the user equipment. These two VoIP bearers are referred to as the "$1^{st}$ RB" and the "$2^{nd}$ RB" within FIG. 10. Furthermore, there is also a dynamic scheduled service running in the user equipment, which is conveyed via a dynamically scheduled radio bearer (referred to as "$3^{rd}$ RB" in FIG. 10).

The scheduler (i.e. the eNode B in this example), configures semi-persistent scheduling via RRC signaling. The user equipment is provided with a semi-persistent grant (PDCCH (SPS)) that is periodically allocating an uplink radio resource on the PUSCH to the user equipment. For a VoIP service, the periodicity of the resource allocation is typically 20 ms as this is the time interval in which the VoIP codec is producing IP packets containing speech data. It may be assumed that semi-persistent resource allocation is activated and the semi-persistently scheduled uplink radio resources on the PUSCH are matching the data rate of the IP packets produced by the VoIP codec which are conveyed by one of the VoIP bearers (here: $1^{st}$ RB). In accordance with the multiplexing rules defined above, all data produced by the VoIP bearer "$1^{st}$ RB" of FIG. 10 are thus transmitted via the semi-persistently scheduled uplink radio resources.

At some point in time, new data of the VoIP bearer "$1^{st}$ RB" arrive in an empty transmission buffer of the user equipment. In a conventional implementation, this event would trigger a buffer status report. In accordance with the rules outlined with respect to FIG. 6 above, the arrival of new data of a semi-persistently radio bearer that is considered in the activated semi-persistent resource allocation, as it is the case for VoIP bearer "1$^{st}$ RB", will not trigger a buffer status report. Accordingly, no scheduling request and no buffer status report is sent by the user equipment in response to the arrival of new data of VoIP bearer "1$^{st}$ RB" in the transmission buffer.

Some time slots later, data of the dynamically scheduled radio bearer "3$^{rd}$ RB" is arriving in the transmission buffer. The arrival of this new data is triggering the transmission of a buffer status report. In this embodiment of the invention, it is assumed for exemplary purposed that buffer status reports are sent via dynamically scheduled resources. Accordingly, the user equipment sends a scheduling request within the next time slot where a PUCCH is configured (PUCCH (SR)) and receives in response thereto from the eNode B a dynamic grant via the PDCCH (PDCCH (DG)) indicating some time slot (or transmission time interval) which is allocated to the user equipment and the transport format (implicitly indicating the transport block size) for the transmission in this time slot (or transmission time interval).

The buffer status report of the user equipment is reporting the buffer status at the time instance of generating same, i.e. when generating the buffer status report, there is data of VoIP bearer "1$^{st}$ RB" and dynamically scheduled radio bearer "3$^{rd}$ RB" in the transmission buffer. As described above with respect to FIG. 5, the user equipment only reports on the data of the dynamically scheduled radio bearer "3$^{rd}$ RB" within the buffer status report, as semi-persistent scheduling is activated (see step 501 of FIG. 5) and the VoIP bearer "1$^{st}$ RB" is considered in the current semi-persistent resource allocation (see step 505 in FIG. 5). Accordingly, the dynamic grant (PDCCH (DG)) obtained from eNode B in response to the scheduling request (PUCCH (SR)) is used to transmit only the triggered buffer status report on data of the dynamically scheduled radio bearer "3$^{rd}$ RB" multiplexed with data of the dynamically scheduled radio bearer "3$^{rd}$ RB" (BSR & data (3$^{rd}$ RB)) on the allocated dynamic resource as per the procedure outlined with respect to FIG. 6 above.

Next, there is new data of VoIP bearer "2$^{nd}$ RB" arriving in the transmission buffer of the user equipment. VoIP bearer "2$^{nd}$ RB" is assumed not to be considered in the semi-persistent resource allocation currently configured for the user equipment, so that—according to the rules set out previously—its data needs to be transmitted via a dynamically allocated resource. To be allocated such resource, the user equipment used the next transmission time interval where a PUCCH is configured to send a scheduling request (PUCCH(SR)) to the eNode B, which allocates dynamic resources and returns a corresponding dynamic grant (PDCCH(DG)) to the user equipment.

Following the transmission time interval the user equipment sends a scheduling request (PUCCH(SR)) to the eNode B for the data of VoIP bearer "2$^{nd}$ RB", the user equipment has a semi-persistently scheduled resource allocated. Following the procedure outlined above with respect to FIG. 6, the user equipment will multiplex only data of VoIP bearer "1$^{st}$ RB" in the transmission buffer to this uplink resource (VoIP data (1$^{st}$ RB)).

Prior to the dynamically allocated PUSCH resource (the allocation of which has been triggered by the scheduling request sent in response to new data of VoIP bearer "2$^{nd}$ RB" arriving in the transmission buffer), new data of dynamically scheduled radio bearer "3$^{rd}$ RB" in the transmission buffer. As the multiplexing of data to the transport block for transmission on the dynamically allocated PUSCH resource considers all data present in the transmission buffer upon the generation of the transport block, in accordance with the procedure of FIG. 6, data of dynamically scheduled radio bearer "3$^{rd}$ RB" and data of VoIP bearer "2$^{nd}$ RB" will be multiplexed to the transport block, e.g. according to the logical channel priorities of the logical channel to which the dynamically scheduled radio bearer "3$^{rd}$ RB" and the VoIP bearer "2$^{nd}$ RB" are mapped, respectively. Depending on the allocation size, the data of a radio bearer may also be segmented.

Accordingly, in the example outlined with respect to FIG. 10, all allocated resources are used for data transmission so that overall the resource utilization in the uplink is optimized.

A further embodiment of the invention is related to situations, where more than one semi-persistently scheduled radio bearer (e.g. two or more radio bearers for VoIP) are configured and where one of the semi-persistently scheduled radio bearers which has been inactive for some time (and is therefore not considered in the semi-persistent resource allocation) is becoming active again or for the first time. In case semi persistent scheduling is already activated and one or more semi-persistently scheduled radio bearers are actively transmitting data on the configured semi-persistent uplink resources, a semi-persistently scheduled radio bearer getting active (again)—i.e. generating data—is not transmitted on the configured semi-persistently allocated uplink resources until a (re-)activation of semi-persistently scheduling is received. Hence, the data of a semi-persistently scheduled radio bearer getting active (again) is transmitted via dynamically allocated resources, until a semi-persistent grant reconfigures ((re-)activates) the semi-persistent resource allocation to take into account the data of the a semi-persistently scheduled radio bearer getting active (again) by increasing the grant accordingly (e.g. by yielding a larger transport block size allowing for the transmission of data from all semi-persistently scheduled radio bearers (expected to be) generated in a given semi-persistent scheduling interval).

Figure 11:
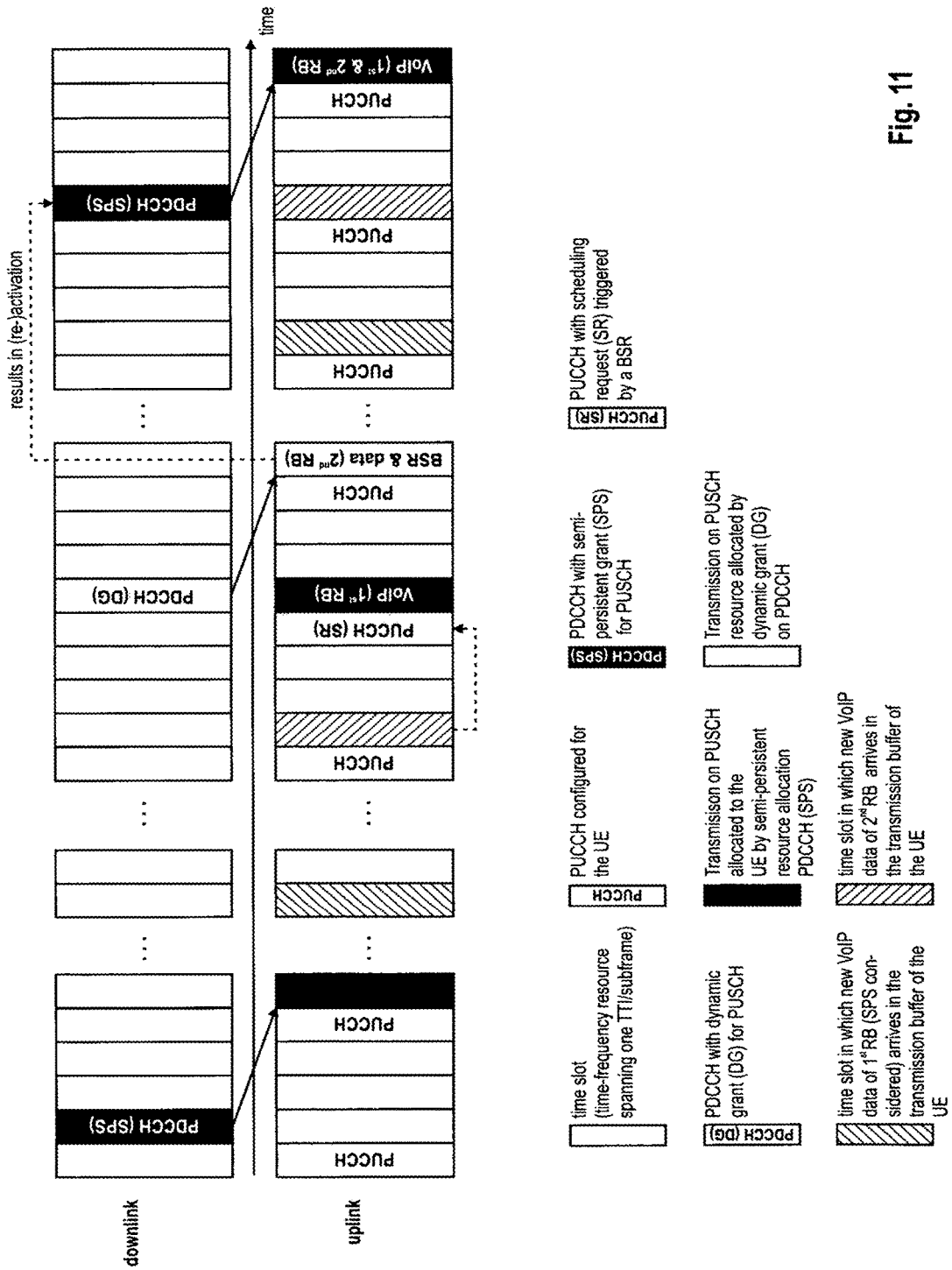
FIG. 11 shows an exemplary transmission of uplink data according to an embodiment of the invention, used for highlighting the advantageous effects obtained by employing the concepts of the invention and improved scheduling.

FIG. 11 is exemplarily highlighting the adaptation of the semi-persistent resource allocation to a semi-persistently scheduled radio bearer (SPS radio bearer) becoming active (again). The exemplary signaling procedure of FIG. 11 according to one embodiment of the invention will also be used to outline another aspect of the invention, namely an improved scheduling mechanism typically implemented in a base station/eNode B based on the additional information on the mobile terminal's/user equipment's status based on the new rules for triggering and generating buffer status reports and multiplexing data to uplink resources as outlined herein.

Generally it is to be noted that applying the procedures outlined with respect to FIG. 5 and FIG. 6 above allows the scheduler (assuming that it is collocated with the data receiver, e.g. the base station/eNode B) may draw several conclusions from the signaling behavior of the data transmitter (e.g. mobile terminal). For example, if semi-persistent resource allocation is activated, the buffer status reports will only report on radio bearers that are not considered in the current semi-persistent resource allocation. Hence, the scheduler can be sure that no semi-persistently scheduled radio bearer that is considered in the current semi-persistent grant will be indicated in the buffer status report.

Furthermore, in case there is any reporting on a semi-persistently scheduled radio bearer in the buffer status report (e.g. a logical channel group to which all a semi-persistently scheduled radio bearers are assigned to is reported on) or by monitoring the content of transport blocks on dynamically allocated resources, the scheduler may further identify that a semi-persistently scheduled radio bearer has become active (again) (when monitoring the uplink transport blocks, the scheduler even knows which of the semi-persistently scheduled radio bearer has become active), and may reconfigure the semi-persistent resource allocation accordingly, e.g. by a so-called reactivation, so as to have the data transmitter transmitting data of this semi-persistently scheduled radio bearer on the semi-persistently allocated resources. Similarly, when monitoring also the content of transport blocks on semi-persistently allocated resources, the scheduler can also detect a semi-persistently scheduled radio bearer becoming inactive again (e.g. a talk-spurt of a VoIP service ends) and may likewise reduce the semi-persistent grant to account only for the remaining semi-persistently scheduled radio bearer(s). Hence, the transport block size allocated by semi-persistently scheduling may be varied based on the additional information obtained from the new procedures for triggering and transmitting buffer status reports and for multiplexing data to transport blocks according to the allocation type.

In FIG. 11, essentially a similar scenario as in FIG. 10 is highlighted. It is assumed that VoIP bearer "$2^{nd}$ RB" is becoming active at some time instance, where semi-persistent scheduling is activated and accounts for active VoIP bearer "$1^{st}$ RB". As in FIG. 10, upon arrival of new data of VoIP bearer "$2^{nd}$ RB" in the transmission buffer, a buffer status report is triggered and the user equipment sends a scheduling request (PUCCH(SR)) on the next available allocated time slot where a PUCCH is configured. The eNode B receiving the scheduling request allocates a dynamic resource to the user equipment by signaling a dynamic grant on a PDCCH (PDCCH (DG)). The user equipment transmits the buffer status report and data of VoIP bearer "$2^{nd}$ RB" on the allocated dynamic resource to the e Node B. From the status report (and optionally from identifying from which radio bearer(s) the data in the transport block originate) the eNode B can conclude that VoIP bearer "$2^{nd}$ RB" (as there are two VoIP bearers configured for the user equipment and VoIP bearer "$1^{st}$ RB" is already considered in the semi-persistent resource allocation). Accordingly, the scheduler of the eNode B may decide to increase the semi-persistent grant such that data of both VoIP bearers configured in the user equipment can be transmitted on the semi-persistently allocated resource. Hence, the eNode B sends another activation (i.e. reactivation) of semi-persistent scheduling yielding the new increased semi-persistent grant, respectively transport block size to the user equipment (PDCCH (SPS)).

The user equipment receives the new semi-persistent grant and may conclude (e.g. from the fact that data of VoIP bearer "$2^{nd}$ RB" having been send on a dynamic resource before and/or based on the increased transport block size matching the average size of data generated by VoIP bearer "$1^{st}$ RB" and VoIP bearer "$2^{nd}$ RB" within the SPS allocation interval) that VoIP bearer "$2^{nd}$ RB" is now also considered in the semi-persistent resource allocation. Accordingly, upon new data of VoIP bearer "$1^{st}$ RB" or VoIP bearer "$2^{nd}$ RB" arriving in the transmission buffer after reactivation of the semi-persistent resource allocation, this data will not trigger any buffer status report and scheduling request. Instead, the data of both VoIP bearers is now transmitted on the reconfigured semi-persistent resources.

In one further exemplary embodiment, the example given above with respect to FIG. 11 is further improved in that the scheduler will not change semi-persistent resource allocation in response to a semi-persistently scheduled radio bearer becoming active right away. This may be beneficial, if the service conveyed by the semi-persistently scheduled radio bearer can be assumed to deliver a quite regular bit rate with low deviation from the mean bit rate (i.e. relatively constant packet sizes in regular intervals) after some time of operation. One example for such type of service is a VoIP service (using IP header compression), where the IP packet size can be assumed to reach a steady state after header compression has properly parameterized and that the IP packets are generated in nearly regular intervals, so that overall a constant bit rate is reached. In this case, the scheduler may allocate data of the semi-persistently scheduled radio bearer conveying such service on dynamic resources, until the data size (number of bits) per semi-persistent scheduling interval is entering a steady state. Upon such steady state being reached, the scheduler may then reactivate the semi-persistent resource allocation with an transport block size (respectively semi-persistent grant) increased according to the steady state data size of the semi-persistently scheduled radio bearer generated within a semi-persistent scheduling interval.

In the example given with respect to FIG. 11, the association of the (re-)activation of semi-persistent scheduling with VoIP bearer "$2^{nd}$ RB" has been simple, as VoIP bearer "$2^{nd}$ RB" is considered the only semi-persistently scheduled radio bearer that became active (again) and that transmitted data via dynamic resources. Accordingly, the user equipment has been able to identify in a simple manner that the (re-)activation of semi-persistent scheduling has been in reaction to VoIP bearer "$2^{nd}$ RB" becoming active. However, if there is yet another VoIP bearer that is getting active (again) before there (re-)activation of the semi-persistent resource allocation occurs, it should be clear on which VoIP bearer the reactivation of the semi-persistent resource allocation has impact. If two VoIP bearers have become active (and data of these bearers has been transmitted on dynamic resources prior to re-activation), the user equipment should be able to find out to which of the VoIP bearers that became active the re-activation of the semi-persistently scheduled resources pertains.

In a further embodiment of the invention, the user equipment may for example obey the rule of always linking the next (re-)activation of the semi-persistent resource allocation to the last semi-persistently scheduled bearer that entered the state of waiting for the SPS reactivation in order to have its data transmitted on the semi-persistently allocated resources. In another embodiment of the invention, the user equipment assume that a (re-)activation of semi-persistent scheduling by means of a semi-persistent grant always considers all semi-persistently scheduled bearer that became active (and those that have been already considered in the previously valid semi-persistent grant).

In an alternative embodiment, the user equipment may also try to determine to which radio bearer or radio bearers the (re-)activation of the semi-persistent resource allocation pertains. Typically, the (re-)activation of the semi-persistent resource allocation to consider one or more further semi-persistently scheduled radio bearer will lead to an increased transport block size being allocated to the user equipment. As the user equipment (as the data source) is also aware of the bit rate of each of the services, it also knows the data size per SPS interval that should be considered in the transport block size for taking into account a respective bearer. Accordingly, in the example above, the user equipment could for example determine the amount of bits the transport block size has been increased in comparison to the previously valid semi-persistent grant and can conclude from this difference, whether it corresponds to the data size per SPS interval of one or both of the two VoIP bearers that have become active. Based on this finding, the user equipment could conclude on the VoIP bearer or VoIP bearers considered in the (re-)activation of the semi-persistent resource allocation.

To highlight the allocation of semi-persistent resource over time (respectively the allocated transport block size (TBS)), an exemplary scheduling for two semi-persistently scheduled radio bearers according to an exemplary embodiment of the invention by a eNode B (comprising the scheduler) is described in the following with respect to FIG. 12. The two semi-persistently scheduled radio bearers are referred to as $1^{st}$ SPS RB and $2^{nd}$ SPS RB in FIG. 12. Initially, the first VoIP bearer ($1^{st}$ SPS RB) is set up. This may be for example realized by conventional RRC signaling. The set up procedure may be enhanced in that the allocation of the VoIP bearer to a predetermined logical channel group for semi-persistently scheduled radio bearers is included to the radio bearer setup message, respectively an indication could be added to this message to inform the user equipment that the radio bearer is suitable for semi-persistent scheduling. As data of the VoIP bearer is potentially subject to semi-persistent scheduling, the eNode B may further configure the semi-persistent resource allocation but may not yet activate same, as no data of the first VoIP bearer ($1^{st}$ SPS RB) is transmitted yet.

Upon the first VoIP bearer ($1^{st}$ SPS RB) starting to generate data that is transmitted via dynamically allocated resources first, the eNode B may decide to activate semi-persistent scheduling (potentially with a new semi-persistent grant matching the data rate of the first VoIP bearer ($1^{st}$ SPS RB). Until activation of semi-persistent scheduling for the first VoIP bearer ($1^{st}$ SPS RB), the data of the first VoIP bearer may trigger a buffer status report and are considered in the buffer status report. When activating semi-persistent scheduling, data of the first VoIP bearer ($1^{st}$ SPS RB) do no longer trigger a buffer status report and are not considered in the buffer status report. If activating semi-persistent scheduling, the TBS of the semi-persistent resource allocation is set to $TB_1$ by the network.

Upon having activated the semi-persistent resource allocation a second VoIP bearer ($2^{nd}$ SPS RB) is set-up. Again, the user equipment may be informed on second VoIP bearer ($2^{nd}$ SPS RB) being also suitable for semi-persistent scheduling during radio bearer setup. When the second VoIP bearer ($2^{nd}$ SPS RB) starts generating data, same is first transmitted via dynamic resources as the semi-persistent resource allocation has not yet taken into account the data of the second VoIP bearer ($2^{nd}$ SPS RB)—SPS TBS is still $TB_1$. Accordingly, the data of the second VoIP bearer ($2^{nd}$ SPS RB) may trigger a buffer status report and are also reported in same.

As described above, the scheduler of the eNode B may decide to allocate second VoIP bearer ($2^{nd}$ SPS RB) on a semi-persistent basis and therefore (re-)activates semi-persistent scheduling sending a grant now indicating a TBS of $TB_2$ which is matching the data size $TB_1$ generated by the first VoIP bearer ($1^{st}$ SPS RB) and the data size $TB_2$−$TB_1$=$TB_3$ generated by the second VoIP bearer ($2^{nd}$ SPS RB) in an SPS interval. The user equipment detects that $TB_2$ is matching the data size of both VoIP bearers and concludes that both VoIP are now considered in the semi-persistent resource allocation. Accordingly, from this point in time new data of the second VoIP bearer ($2^{nd}$ SPS RB) will not trigger any buffer status report and are no longer considered in the buffer status reports.

Figure 12:
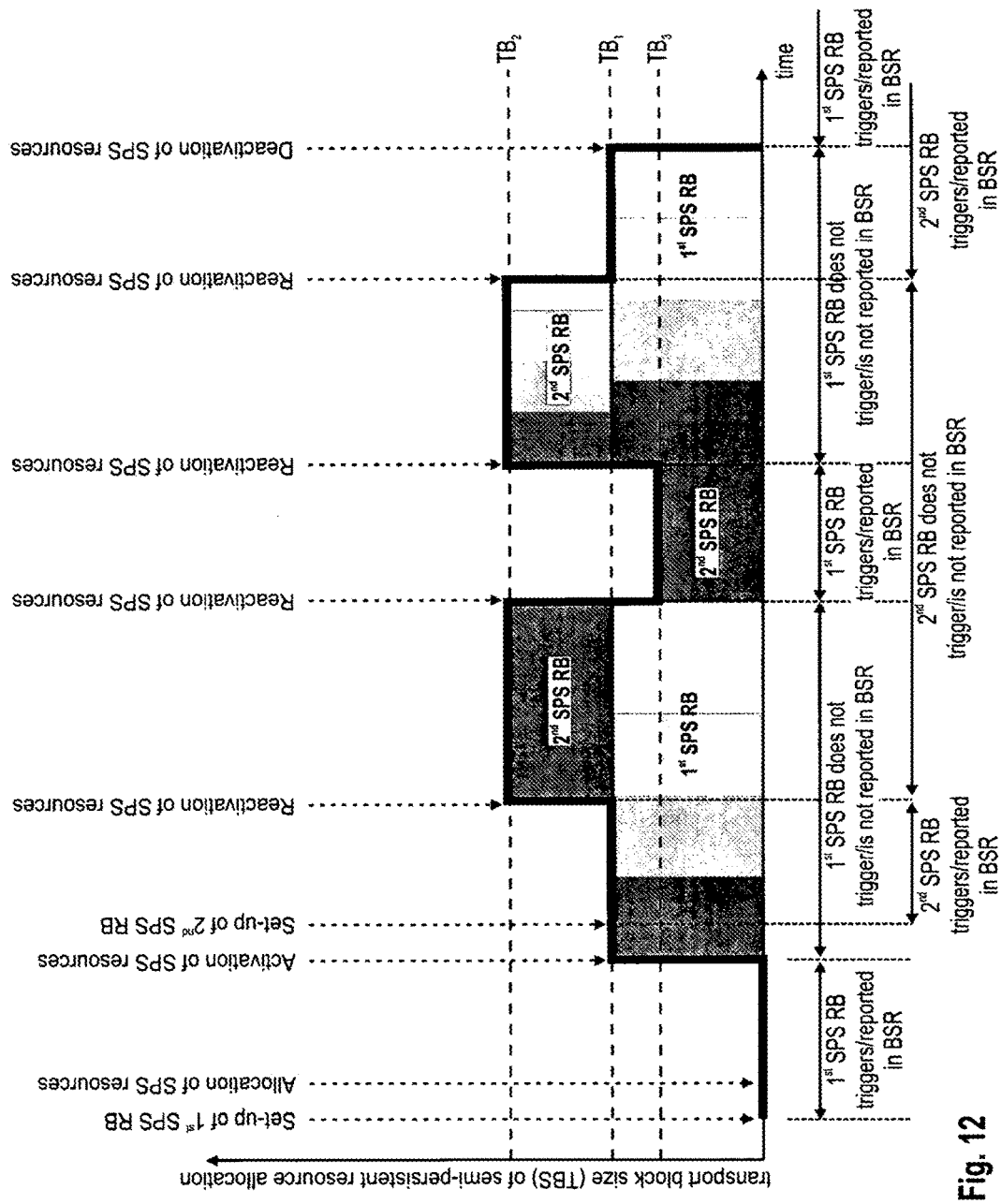
FIG. 12 shows the transport block size of a semi-persistent resource allocation for two semi-persistently scheduled radio bearers according to an exemplary embodiment of the invention.

In FIG. 12, the gradient of the rectangles indicating the portions of the TBS "stemming" from the first VoIP bearer ($1^{st}$ SPS RB) and the second VoIP bearer ($2^{nd}$ SPS RB) is intended to indicate a decrease of the data rate of a respective bearer over time (e.g. if a talk spurt ends). For example, the eNode B detects that the first VoIP bearer ($1^{st}$ SPS RB) is no longer generating data and may decide to use dynamic scheduling for the first VoIP bearer ($1^{st}$ SPS RB). Therefore, the eNode B may again (re)-activate semi-persistent scheduling by allocating a TBS of $TB_3$ to thereby only account for the second VoIP bearer ($2^{nd}$ SPS RB) in the semi-persistent resource allocation. Accordingly, new data of the first VoIP bearer ($1^{st}$ SPS RB) may now again trigger buffer status reports and are reported in buffer status reports to the eNode B. As first VoIP bearer ($1^{st}$ SPS RB) is assumed to become active again, the eNode B may decide to schedule the bearer on a semi-persistent basis and once again (re)-activate semi-persistent scheduling by allocating a TBS of $TB_2$ to account for both VoIP bearers. Thereupon, it is further assumed that both VoIP bearers become inactive so that finally the eNode B decides to deactivate semi-persistent scheduling. Upon deactivation of semi-persistent scheduling, the VoIP bearers are essentially treated as dynamically scheduled bearers and may therefore trigger buffer status reports and their data gets reported in the buffer status reports.

It should be noticed that throughout this document this invention is described with the assumption that semi-persistent resource allocation has been considered where there is a radio resource allocated on a semi-persistent basis with a given periodicity (SPS interval) configured for a communication node—this is also referred to as one SPS pattern. However, the concepts of the invention are still applicable, if multiple SPS patterns are available to the communication node, i.e. there are different SPS intervals defined which may each have a respective semi-persistent grant (when activated). In this case semi-persistently scheduled radio bearers could be bound to a specific SPS pattern. The concepts of the invention as described herein may be applied per SPS pattern to all the semi-persistently scheduled radio bearers.

Furthermore, the in some embodiment of the invention, the concepts of the invention have been described with respect to an improved 3GPP LTE system, where there is one component carrier configured on the air interface. The concepts of the invention may also be equally applied to a 3GPP LTE-Advanced (LTE-A) system presently discussed in the 3GPP.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method implemented in a mobile communication system including a mobile terminal and a base station, the method comprising:
   the base station transmitting to the mobile station a semi-persistent scheduling configuration via physical downlink control channel (PDCCH) signaling;
   the mobile terminal receiving from the base station the semi-persistent scheduling configuration via the PDCCH signaling;
   when semi-persistent scheduling is not activated, the mobile terminal transmitting to the base station a scheduling request to request uplink resources for uplink transmission including uplink transmission of a buffer status report;
   when semi-persistent scheduling is activated, the mobile terminal checking a setup information element of a logical channel as part of a buffer status reporting procedure to determine whether to trigger a scheduling request for the logical channel;
      when the mobile terminal determines to trigger the scheduling request, the mobile terminal transmitting the scheduling request to the base station for the logical channel; and
      when the mobile terminal determines not to trigger the scheduling request, the mobile terminal not transmitting the scheduling request to the base station;
   wherein the mobile communication system is selectively operable in one of at least a dynamic scheduling mode, in which radio resources are dynamically allocated by dynamic grants, and a semi-persistent scheduling mode, in which radio resources are allocated on a semi-persistent basis by semi-persistent scheduling grants.

2. The method according to claim 1, wherein the setup information element of the logical channel indicates that a buffer status report is not triggered.

3. The method according to claim 2, wherein the setup information element of the logical channel indicates that the buffer status report is not triggered despite that data has become available for the logical channel.

4. The method according to claim 2, wherein the setup information element of the logical channel indicates that the buffer status report is not triggered due to activation of the semi-persistent scheduling.

5. The method according to claim 1, wherein the mobile terminal determines to trigger the scheduling request when the setup information element of the logical channel indicates activation of the semi-persistent scheduling.

6. The method according to claim 1, wherein the mobile terminal determines to trigger the scheduling request when the setup information element of the logical channel indicates that data has become available for the logical channel.

7. The method according to claim 1, further comprising:
   when semi-persistent scheduling is not activated, no uplink resources are allocated for a transmission time interval, and a buffer status report has not been triggered, the mobile terminal transmitting to the base station the scheduling request to request uplink resources for uplink transmission of a buffer status report.

8. The method according to claim 1, further comprising:
   the mobile terminal considering an activation status of semi-persistent resource allocation to determine whether to trigger the buffer status report.

9. The method according to claim 1, further comprising:
   the mobile terminal considering a scheduling mode status to determine on which logical channel to report in the buffer status report.

10. The method according to claim 9, wherein the scheduling mode status is an activation of the semi-persistent scheduling or a deactivation of the semi-persistent scheduling.

11. A mobile communication system comprising:
    a base station configured to transmit a semi-persistent scheduling configuration via physical downlink control channel (PDCCH) signaling, and
    a mobile terminal including:
      a receiver configured to receive the PDCCH signaling including the semi-persistent scheduling configuration,
      a controller configured to cause the mobile terminal to selectively operate, based on the PDCCH signaling, in one of at least a dynamic scheduling mode, in which radio resources are dynamically allocated by dynamic grants, and a semi-persistent scheduling mode, in which radio resources are allocated on a semi-persistent basis by semi-persistent scheduling grants, and
      a transmitter configured to transmit a scheduling request to the base station to request uplink resources for uplink transmission including uplink transmission of a buffer status report,
    wherein the controller of the mobile terminal is configured to:
      when semi-persistent scheduling is not activated, cause the transmitter to transmit the scheduling request,
      when semi-persistent scheduling is activated, check a setup information element of a logical channel as part of a buffer status reporting procedure to determine whether to trigger a scheduling request for the logical channel,
      when determining to trigger the scheduling request, cause the transmitter to transmit the scheduling request for the logical channel, and
      when determining not to trigger the scheduling request, not cause the transmitter to transmit the scheduling request.

12. The mobile communication system according to claim 11, wherein the setup information element of the logical channel indicates that a buffer status report is not triggered.

13. The mobile communication system according to claim 12, wherein the setup information element of the logical channel indicates that the buffer status report is not triggered despite that data has become available for the logical channel.

14. The mobile communication system according to claim 12, wherein the setup information element of the logical channel indicates that the buffer status report is not triggered due to activation of the semi-persistent scheduling.

15. The mobile communication system according to claim 11, wherein the controller of the mobile terminal determines to trigger the scheduling request when the setup information element of the logical channel indicates activation of the semi-persistent scheduling.

16. The mobile communication system according to claim 11, wherein the controller of the mobile terminal determines to trigger the scheduling request when the setup information element of the logical channel indicates that data has become available for the logical channel.

17. The mobile communication system according to claim 11, wherein
the controller of the mobile terminal causes the transmitter to transmit to the base station the scheduling request to request uplink resources for uplink transmission of a buffer status report, when semi-persistent scheduling is not activated, no uplink resources are allocated for a transmission time interval, and a buffer status report has not been triggered.

18. The mobile communication system according to claim 11, wherein
the controller of the mobile terminal considers an activation status of semi-persistent resource allocation to determine whether to trigger the buffer status report.

19. The mobile communication system according to claim 11, wherein
the controller of the mobile terminal considers a scheduling mode status to determine on which logical channel to report in the buffer status report.

20. The mobile communication system according to claim 19, wherein the scheduling mode status is an activation of the semi-persistent scheduling or a deactivation of the semi-persistent scheduling.

* * * * *